United States Patent [19]
Bowers

[11] Patent Number: 5,996,171
[45] Date of Patent: Dec. 7, 1999

[54] VACUUM TRUCK SYSTEM

[76] Inventor: Randy Bowers, P.O. Box 508, Wooster, Ohio 44691

[21] Appl. No.: 09/015,182

[22] Filed: Jan. 29, 1998

Related U.S. Application Data

[60] Provisional application No. 60/037,127, Feb. 4, 1997.
[51] Int. Cl.$^6$ ....................................................... A47L 5/12
[52] U.S. Cl. ............................... 15/340.1; 15/347; 406/39
[58] Field of Search ............................... 15/340.1, 340.3, 15/340.4, 347; 134/21; 55/356, 385.3, 395, 429; 406/39, 42, 43, 141, 145

[56] References Cited

U.S. PATENT DOCUMENTS

| | | | |
|---|---|---|---|
| 4,193,159 | 3/1980 | Beard | 15/340.1 |
| 4,227,893 | 10/1980 | Shaddock | 15/340.1 |
| 5,010,620 | 4/1991 | Young | 15/340.3 |
| 5,030,259 | 7/1991 | Bryant et al. | 15/340.1 |
| 5,062,868 | 11/1991 | Kennedy | 55/429 |
| 5,218,737 | 6/1993 | Dansby et al. | 15/340.1 |

FOREIGN PATENT DOCUMENTS

| | | | |
|---|---|---|---|
| 2751423 | 5/1978 | Germany | 15/340.1 |

*Primary Examiner*—Terrence R. Till
*Attorney, Agent, or Firm*—Ralph E. Jocke

[57] ABSTRACT

A vacuum truck system (10) includes a truck portion (12) and a removable hopper (14). The truck portion includes thereon a vacuum source (20) as well as filter units (22, 24) and separator units (26, 28). The interior of the hopper is in connection with the vacuum source, and material is enabled to be drawn into the interior of the hopper for collection therein. The hopper is mounted on a tilt bed portion (74) of the truck. Extending a pair of arms (82) enables the tilt bed portion and the hopper thereon to be tilted so that the contents of the hopper may be discharged through an opening which is selectively opened by a door (54). Alternatively, the hopper (14) may be rolled off the tilt bed portion, and a new hopper installed thereon. The tilting of the tilt bed portion automatically connects and disconnects the hopper from the vacuum source. In addition, the vacuum truck system further includes a system for cleaning of material captured in the filters and separators for depositing such material in the hopper (14).

23 Claims, 20 Drawing Sheets

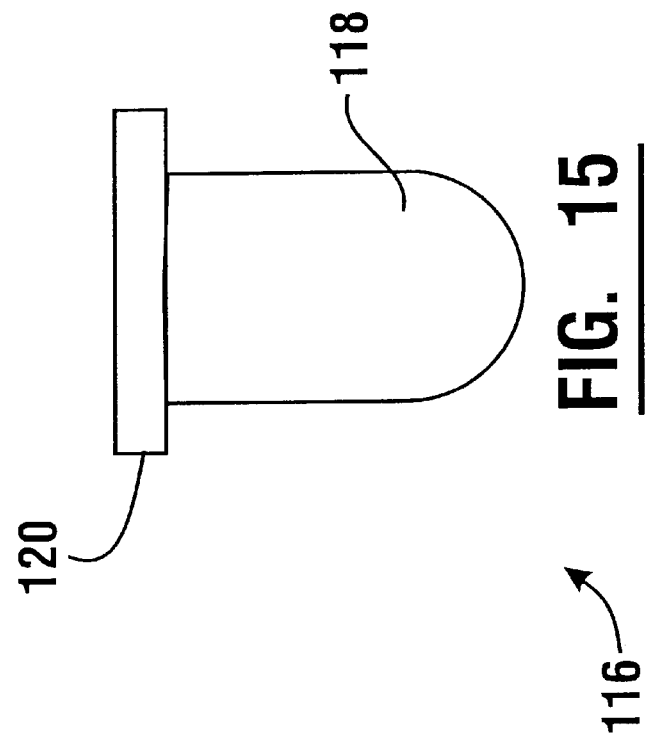
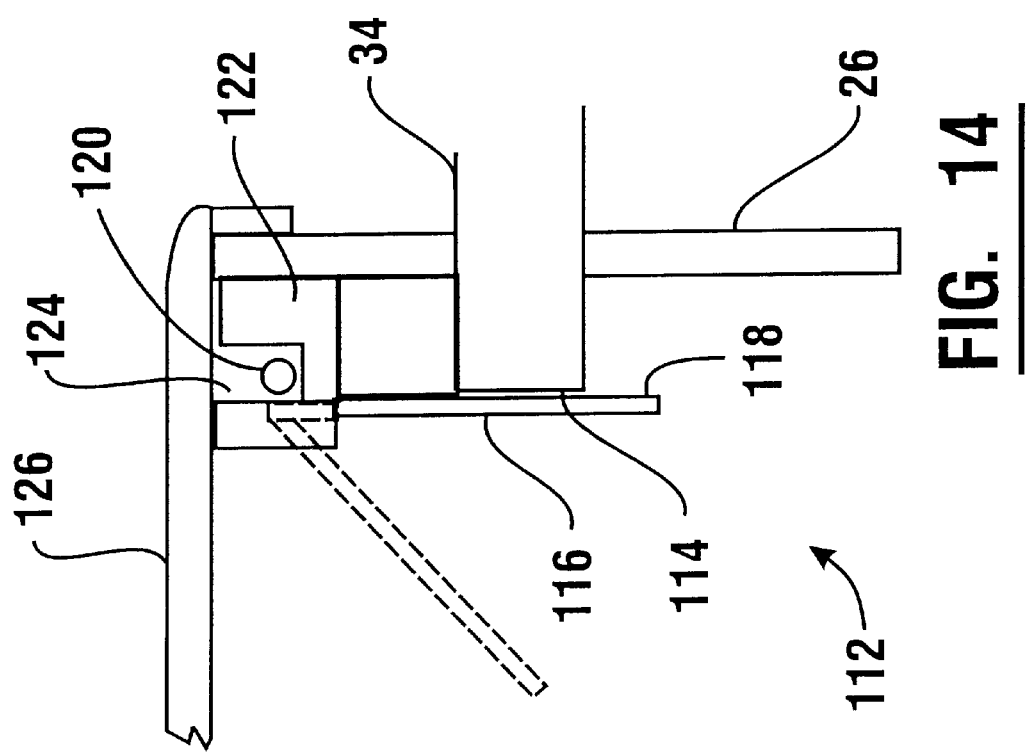

VACUUM TRUCK SYSTEM

This appln claims the benefit of provisional appln. Ser. No. 60/037,127 filed Feb. 4, 1997.

TECHNICAL FIELD

This invention relates to industrial equipment. Particularly this invention relates to a vacuum truck system which enables drawing material into a container mounted on the truck. The container may be emptied of the collected material while on the truck, or the container may be removed from the truck and replaced with a similar container.

BACKGROUND ART

Vacuum truck systems are known in the prior art. Such systems have been used to collect various types of materials. These materials may include liquids, solids or mixtures of both.

Conventional vacuum truck systems include a material collection container permanently mounted to a truck chassis. Also mounted to the truck chassis is a vacuum source. The vacuum source is used to draw air through the container. The container is connected to a hose which is placed in close proximity to the material to be collected. The vacuum produced causes air as well as the material being collected to be drawn into the container.

The material that is collected in the container of a vacuum truck system must be periodically removed. To accomplish this such containers conventionally contain cleanout doors which can be opened. Once the material collected has been removed through the cleanout door, the door can be closed and the vacuum truck system placed back in service.

There is often considerable cost associated with the operation of conventional vacuum truck systems. This is because the material collected often needs to be taken to a remote site from where it is collected for treatment or disposal. It is not uncommon for vacuum trucks to travel long distances to discharge collected material. Such travel time represents unproductive time for the system and increases removal costs. Vacuum trucks loaded with collected material are heavy, and travel long distances may result in substantial wear on tires and other vehicle components.

Conventional vacuum trucks also often are required to collect various types of materials. The materials that must be collected are often incompatible with other materials. Such incompatibility may result in undesirable chemical or incendiary reactions. As a result, care must be exercised to maintain such collected materials in separate containers. When situations of this type arise, multiple vacuum trucks are commonly used. Alternatively, a single vacuum truck may be used if the container which holds the material is thoroughly cleaned before an incompatible material is collected. Either approach is costly.

It is also common to encounter situations where the material collected is not a waste material, but instead must be recycled or placed back in service. When this occurs it is very important to provide a container that is not contaminated with other materials. Further, the material from which the holding container is made must be compatible with the material being collected. Such situations may require that a vacuum truck be custom made for the particular type of operation to be performed.

Thus, there exists a need for a vacuum truck system with a container which may have its contents discharged while the container is mounted on the truck, or which may be removed from the truck and replaced with a different container.

DISCLOSURE OF INVETION

It is an object of the present invention to provide a vacuum truck system which enables the collection of material.

It is a further object of the present invention to provide a vacuum truck system which includes material collection containers from which the collected material may be discharged.

It is a further object of the present invention to provide a vacuum truck system which includes interchangeable removable material collection containers.

It is a further object of the present invention to provide a vacuum truck system that enables the material collection container to be quickly and easily mounted and removed from a vacuum truck.

It is a further object of the present invention to provide a vacuum truck system that enables temporary storage of collected material.

It is a further object of the present invention to provide a vacuum truck system in which the service time of the system may be optimized by the substitution of material collection containers.

It is a further object of the present invention to provide a vacuum truck system which enables transportation of material collection containers that have been removed from a vacuum truck by other vehicles.

It is a further object of the present invention to provide a vacuum truck system that lowers material transportation cost and the weight of vehicles that transport collected material.

It is a further object of the present invention to provide a vacuum truck system that enables the quick substitution of damaged or contaminated material collection containers.

It is a further object of the present invention to provide a vacuum truck system that enables a material collection container to be automatically connected to the vacuum source when it is mounted on a vacuum truck.

It is a further object of the present invention to provide a vacuum truck system in which a material collection container is automatically disconnected from a vacuum source when its contents are being dumped or as it is removed from the truck.

It is a further object of the present invention to provide a vacuum truck system that includes a multi-stage filter system which is fluidly intermediate of a material collection container and a vacuum source.

It is a further object of the present invention to provide a vacuum truck system that includes means for cleaning an onboard filtration system.

It is a further object of the present invention to provide a vacuum truck system that enables material cleaned from an onboard filter system on a truck to be collected in a material collection container and held with other collected material.

It is a further object of the present invention to provide a vacuum truck system that is reliable in operation and economical to manufacture and use.

Further objects of the present invention will be made apparent in the following Best Modes for Carrying Out Invention and the appended claims.

The foregoing objects are accomplished in a preferred embodiment of the invention by a vacuum truck system. The vacuum truck system includes a truck portion and a removable container portion or hopper. The hopper portion may be selectively mounted on or removed from the truck portion.

The truck portion includes a vacuum source and a multistage filtration system. The truck portion further includes a tilt bed portion for supporting the hopper thereon when the hopper portion is mounted on the truck portion. The tilt bed portion also enables tilting the hopper portion so as to dump the contents thereof, or alternatively enables guiding the hopper portion on and off the truck portion.

The truck portion further includes a vacuum source permanently mounted thereon. The vacuum source is preferably a high capacity vacuum pump. The vacuum pump is connected in parallel to material removal mechanisms. Each material removal mechanism includes a multiple bag filter which is a part of the mechanism. Each of the bag filters is connected in turn to a cyclone type separator. Each cyclone type separator is engageable to a coupling which fluidly connects a conduit that extends into the hopper when the hopper is mounted on the truck.

In operation of the system with the hopper portion mounted on the truck portion, the vacuum source is in connection with the hopper portion through the filter bag units and cyclone separators. The interior of the hopper is connected to an external hose or conduit. Air drawn through the hose or external conduit pulls material to be collected into the container. The container is configured such that the vast majority of material pulled in by the vacuum action is collected in the interior area of the container. Air drawn out of the container is passed through the cyclone separators and the bag filters to minimize the risk of the material reaching the vacuum pump. Once the material has been collected in the container, a door at the rear of the container may be opened and the tilt bed raised. This causes the material collected in the container to be dumped therefrom.

Alternatively, when material has been collected in the container the tilt bed may be raised and the hopper guided off the tilt bed. Thereafter an empty hopper may be guided on to the tilt bed to replace the one that has been removed. As hoppers are installed and removed from the tilt bed they are automatically connected and disconnected from the vacuum source. Hoppers that have been removed from the tilt bed may be maintained in place for purposes of storing collected material or may be loaded on to another vehicle for transport to a location where the material therein may be further processed or disposed of.

BRIEF DESCRIPTION OF DRAWINGS

FIG. 14 is a side view of a check valve used in the second embodiment of the vacuum piping shown in FIG. 13.

FIG. 15 is a front view of a valve element of the check valve shown in FIG. 14.

BEST MODES FOR CARRYING OUT INVETION

Figure 1:
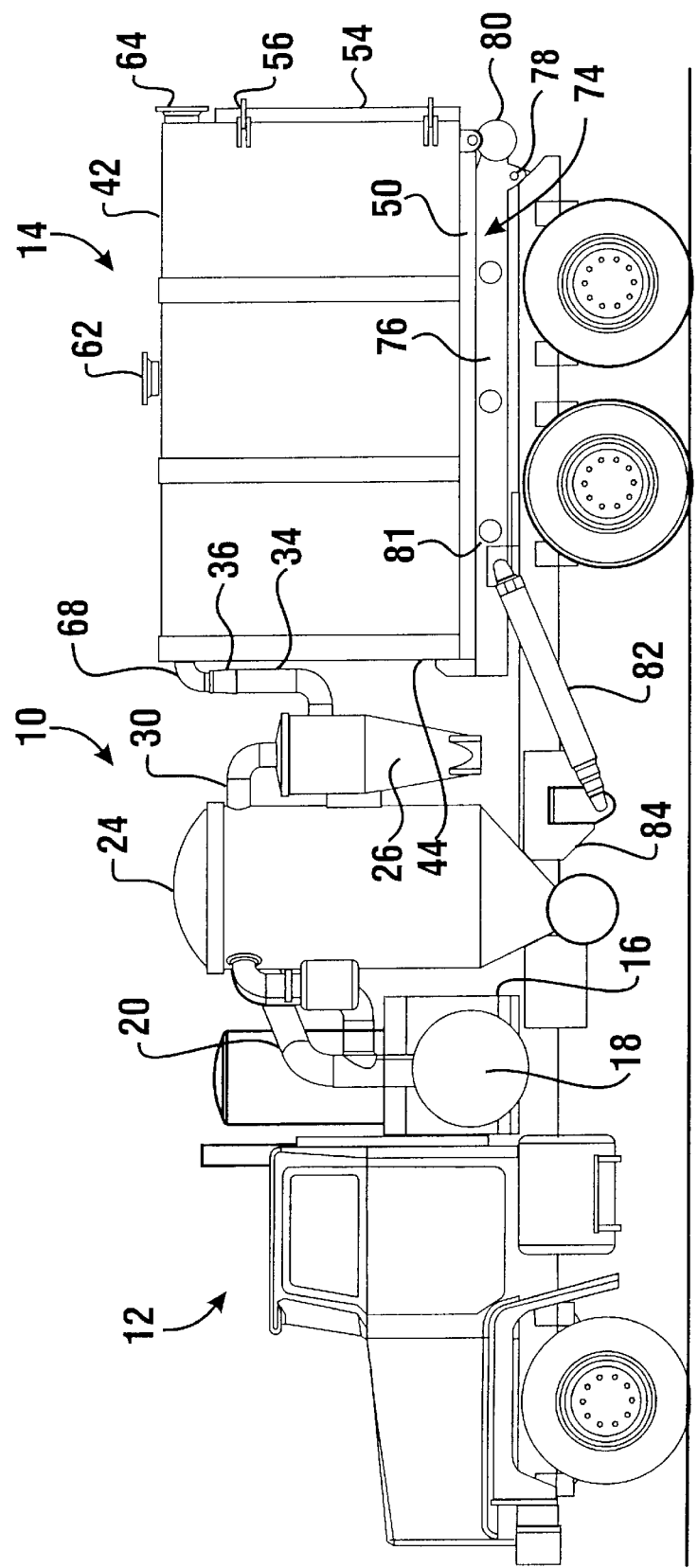
FIG. 1 is a side elevational view of the vacuum truck system of a first embodiment of the present invention.

Referring now to the drawings and particularly to FIG. 1, there is shown therein a vacuum truck system of a preferred embodiment of the present invention generally indicated 10. The system 10 includes a truck portion generally indicated 12 and a container or hopper 14. Truck portion 12 includes a truck chassis of the conventional type including an engine, transmission and other conventional components that are used to propel a vehicle. In other embodiments of the invention other types of self propelled vehicles may be used.

Vacuum truck system 10 further includes mounted on the truck portion a vacuum source 16. Vacuum source 16 is preferably a high capacity vacuum pump of the positive displacement type. Vacuum pump 16 is preferably powered by the engine of the truck portion and produces a sufficiently high vacuum at suitable flowrates for collection of the type of materials that are desired to be collected in the hopper 14.

Vacuum source 16 is in connection with a filter housing 18. Filter housing 18 houses a final filter for air that is being drawn into the vacuum pump. In the preferred form of the invention the final filter is a fine stainless steel screen mesh type filter. However in other embodiments, other types of final filters may be used. Filter housing 18 is in fluid connection with a manifold 20. Manifold 20 is connected to a first filter unit 22 and a second filter unit 24. In the preferred embodiment of the invention first and second filter units 22 and 24 are bag house type filters wherein a plurality of filter bags extend within the unit. Vacuum being drawn on the filter housings through the manifold 20 causes air to flow from an area outside the bags within the filter housings to areas inside of the bags. As air flows through the bags particulates tend to collect on the exterior surfaces of the bags until removed in a manner later explained.

Figure 2:
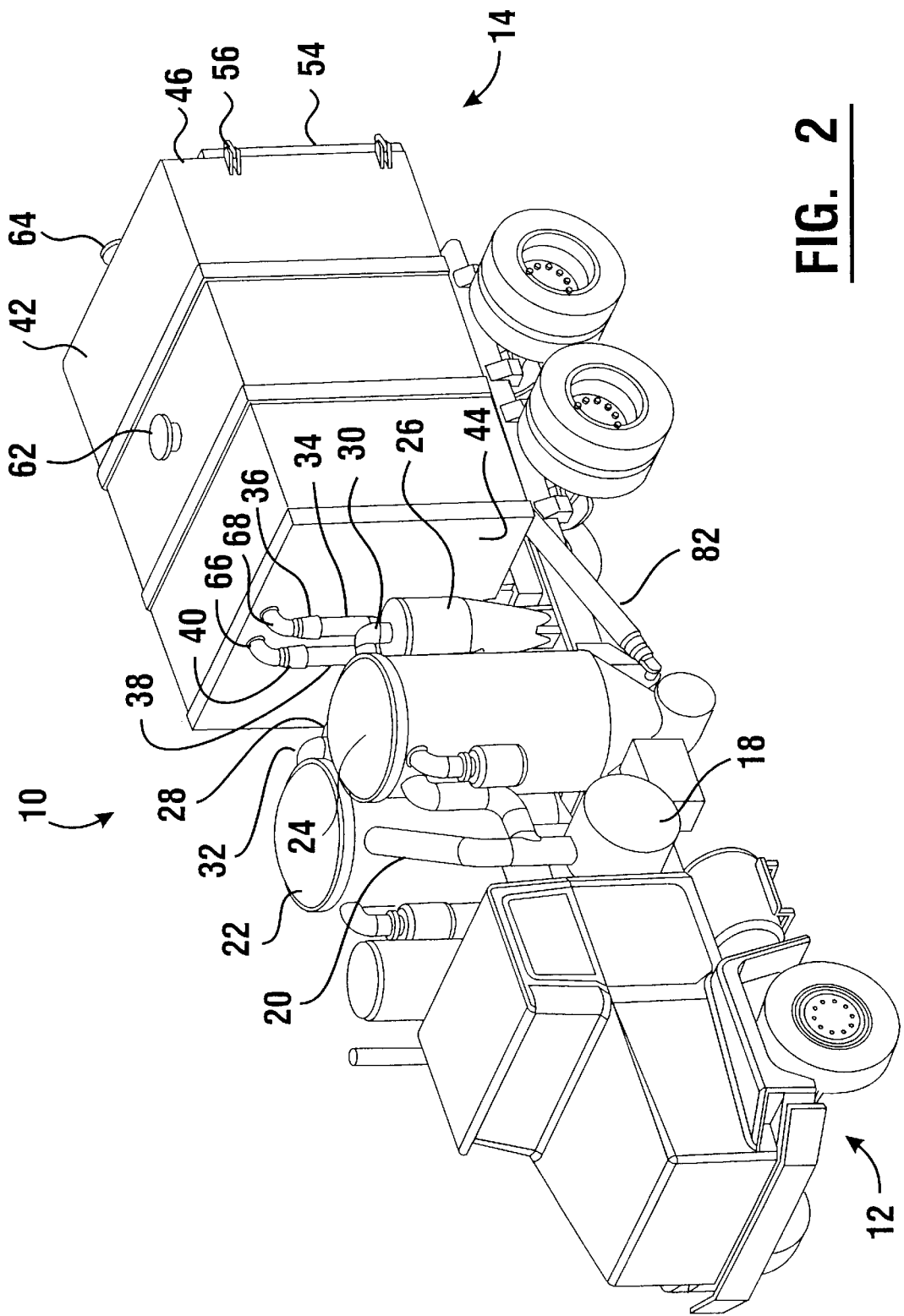
FIG. 2 is a right front perspective view of the vacuum truck system shown in FIG. 1.

Also mounted on the truck portion is a first cyclone separator 26 and a second cyclone separator 28, which is only partially shown in FIG. 2. Cyclone separators 26 and 28 are identical units in the preferred embodiment. The cyclone separators operate using centrifugal action to separate particulate materials in the air flow passing therethrough. The particulate materials in the air flow tend to settle to the bottom portions of the cyclone separators and may be removed therefrom in a manner later explained. Cyclone separator 26 has an outlet 30 which is connected to an inlet of second filter unit 24. Cyclone separator 28 has an outlet 32 which is connected to an inlet of first filter unit 22. As a result of this configuration, air may be first required to pass through the cyclone separators wherein heavy particulate materials are separated before the air passes into the filter units. As later discussed, valving may be provided in alternative embodiments for changing the flow to selectively bypass the cyclone separators or filter units.

Cyclone separator 26 has an inlet pipe 34 attached thereto. Inlet pipe 34 terminates at an upward extending open end. The inlet pipe is releasably engaged to a boot connector 36 which in the preferred embodiment is attached to the hopper. Boot connector 36 is preferably comprised of resilient material so as to form a relatively airtight fit with the open end of the inlet pipe in a manner later explained. Cyclone separator 28 has connected thereto an inlet pipe 38 which is similar to the inlet pipe 34 connected to the cyclone separator 26. Inlet pipe 38 has an open end which is engageable with boot connector 40 which is attached to the hopper.

Figure 9:
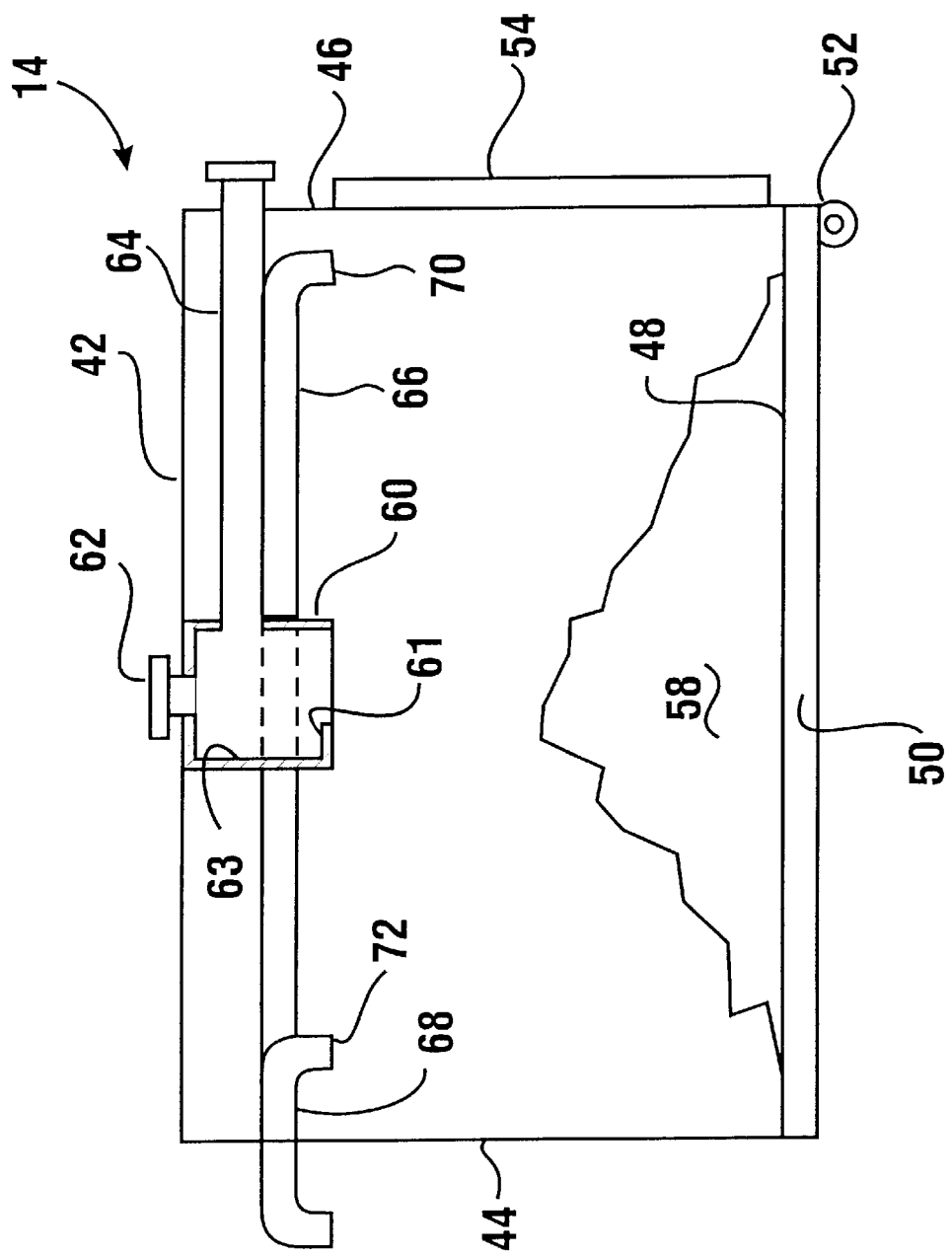
FIG. 9 is a side cross sectional view of the hopper of the vacuum truck system.
Figure 10:
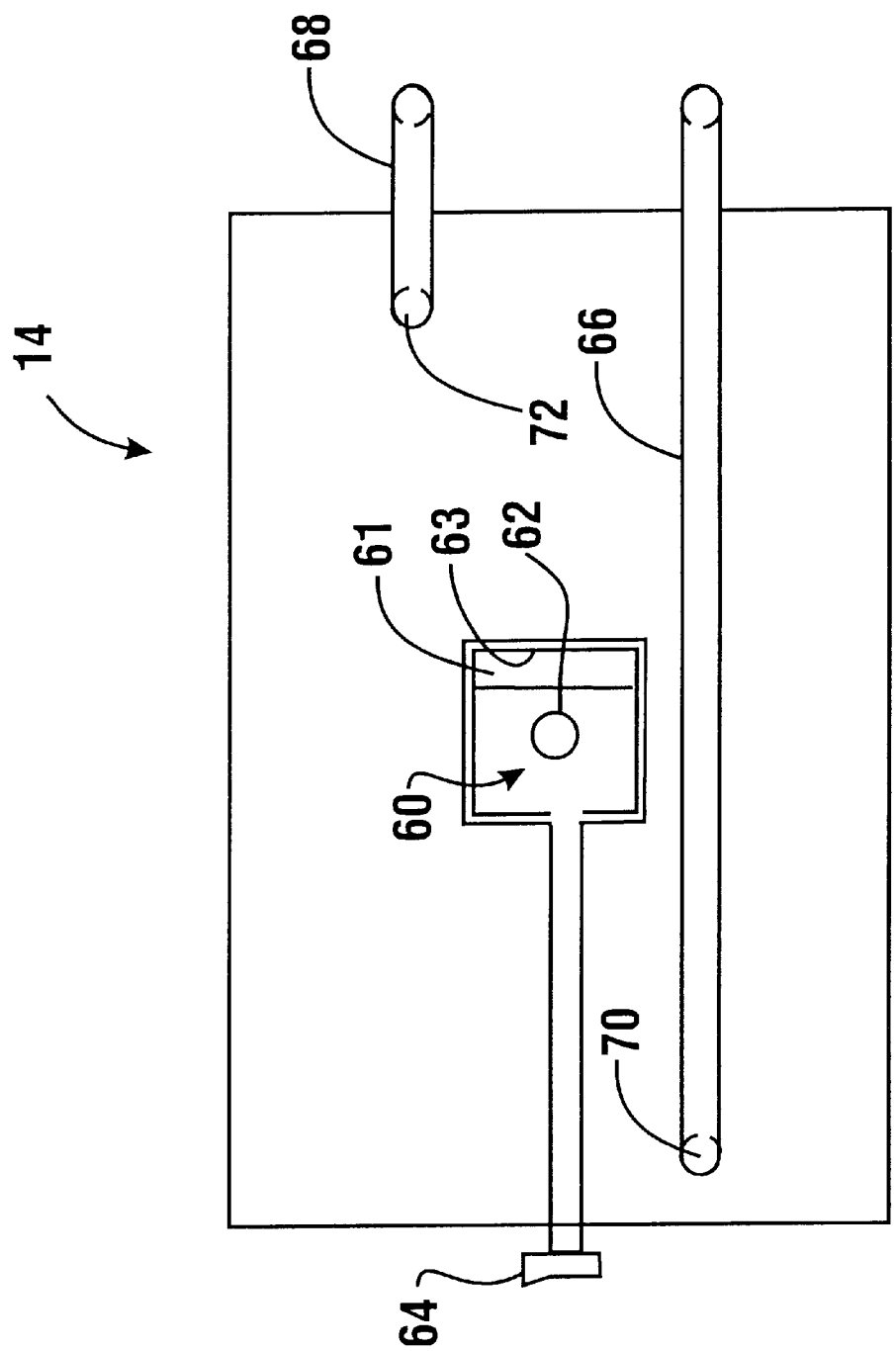
FIG. 10 is a top sectional view of the hopper.

The construction of hopper 14 is shown in greater detail in FIGS. 9 and 10. Hopper 14 is a generally rectangular container with an open interior area. The interior area of hopper 14 is bounded by a top wall 42, a front wall 44 and a rear wall 46. Hopper 14 also has a bottom wall 48 as well as a pair of side walls which are not shown in the cross sectional view in FIG. 9. Bottom wall 48 is supported on a plurality of rail members 50. Rollers 52 are operatively attached to rail members 50 and are rotationally movable relative thereto.

Rear wall 46 has an opening therein which opening is not separately shown. The opening in rear wall 46 may be selectively opened and closed by door 54. Door 54 is mounted for rotational movement on hinges 56 as shown in FIG. 1. It should be understood however that although the embodiment shown has side-mounted hinges, in other embodiments the door may be mounted on top hinges or bottom hinges depending on the requirements of the system. Door 54 may be opened to remove material schematically indicated 58, which collects within the interior area of container 14.

Container 14 houses a central plenum chamber 60. Plenum chamber 60 is centrally located within the interior of the container. Plenum chamber 60 is connected to a first conduit 62 which extends through top wall 42 of the container. Plenum chamber 60 is also connected to a second conduit 64 which extends through rear wall 46 of the container. Each of the conduits 62 and 64 are adapted for connection to a hose or other conduit through which material may be drawn into the hopper 14. It should be understood that while the system is in use generally only one of the conduits 64 or 62 will be used for drawing in material. The other conduit, which is unused, will be blocked by an appropriate blanking flange or other suitable means for closing the conduit. The configuration of conduit 62 and 64 as well as the plenum chamber 60 enables material that is drawn into the hopper to be deposited in the center thereof regardless of which conduit is being used.

Plenum chamber 60 includes a lower shelf surface 61. Shelf surface 61 restricts the shedding of material from wall 63 which bounds the interior of the plenum chamber on a side opposite second conduit 64. Shelf surface 61 operates to cause limited accumulation of collected material on the surface of wall 63 when conduit 64 is being used. This accumulated material reduces erosion of wall 63 due to abrasive action of material flowing into the hopper.

Hopper 14 further includes a first suction pipe 66 and a second suction pipe 68. First suction pipe 66 includes an opening thereto 70 which is in the interior area of the hopper and is adjacent to rear wall 46. Second suction pipe 68 has an opening 72 which is adjacent to front wall 44 of the hopper. First suction pipe 66 extends through wall 44 and boot connector 40 is attached thereto. Similarly, second suction pipe 68 extends through front wall 44 and boot connector 36 is attached thereto.

It should be noted that openings 70 and 72 are disposed on opposed sides of the interior area of hopper 14. This maximizes the amount of material that may be collected within the interior area of the hopper. This result is achieved because both openings are disposed a substantial distance from the plenum chamber 60. This enables the material that is drawn into the hopper 14 to be maintained in relatively quiescent slow moving air therein. Quiescent air flow conditions within the hopper enable particulates to fall out of the air flow and to collect within the hopper. This also minimizes the amount of material that will be drawn out of the hopper by the flow of air into openings 70 and 72 of the suction pipes 66 and 68.

Figure 11:
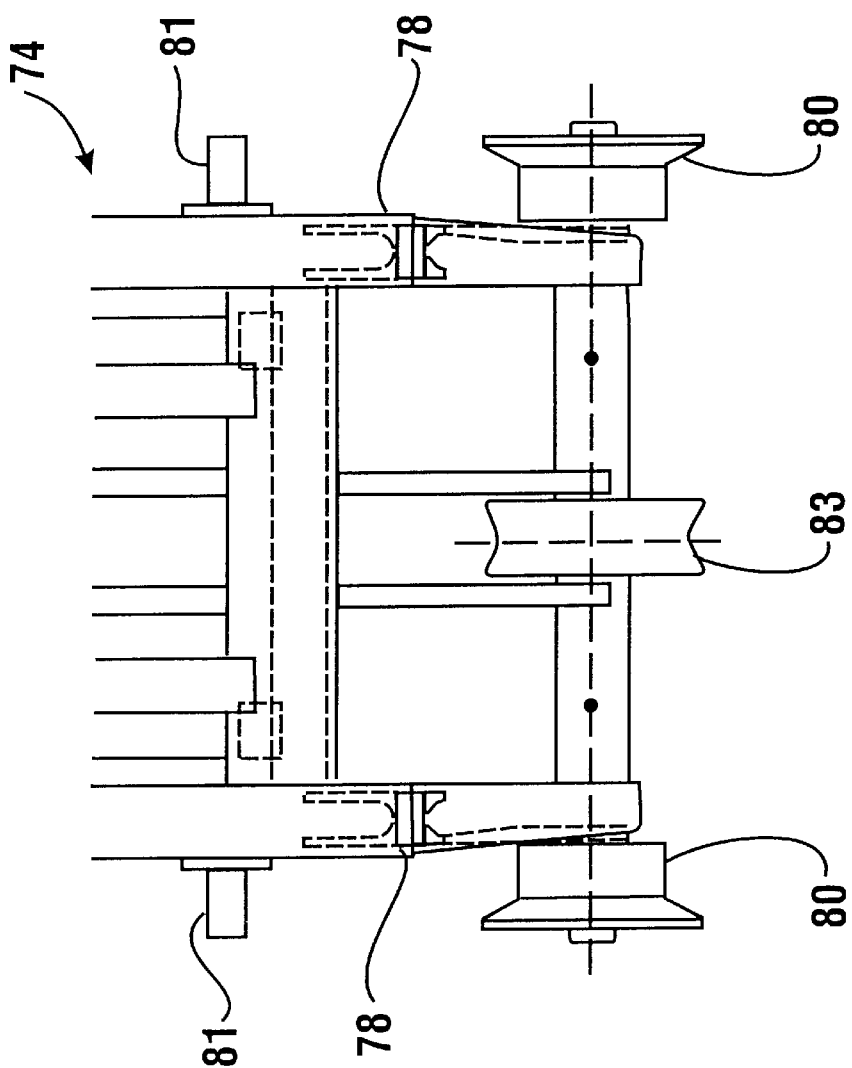
FIG. 11 is a partial top plan view of the tilt bed of the truck portion.

Truck portion 12 further includes a tilt bed portion 74. Tilt bed portion 74 comprises a frame 76. Frame 76 is rotatably attached to the truck portion at a pivot 78. Pivot 78 is preferably located adjacent the rear most portion of the hopper 14 and the truck portion 12. Frame 76 is preferably adapted for receiving rail members 50 of hopper 14 thereon in guided relation. Tilt bed portion 74 further includes rear guide rollers 80 and frame rollers 81 which are rotationally movable relative to the frame 76 which facilitate the movement of the rail members thereon. (See FIG. 11)

A pair of telescoping arms 82 extend between a frame 84 of the truck portion and the frame 76 of the tilt bed portion. Arms 82 preferably extend on each side of the truck portion and are mounted so as to be rotationally movable relative to both frame 84 and frame 76. Arms 82 are preferably comprised of hydraulic cylinders and are extended in response to the delivery of hydraulic fluid to a first chamber or series of chambers therein. Similarly the arms 82 are retracted in response to delivery of hydraulic fluid to a second chamber while releasing the fluid from the first chamber. It should be understood that the truck portion 12 includes a hydraulic power unit of the conventional type which provides a source of pressurized hydraulic fluid and valving which delivers fluid in a controlled manner for purposes of extending and retracting arms 82.

Figure 3:
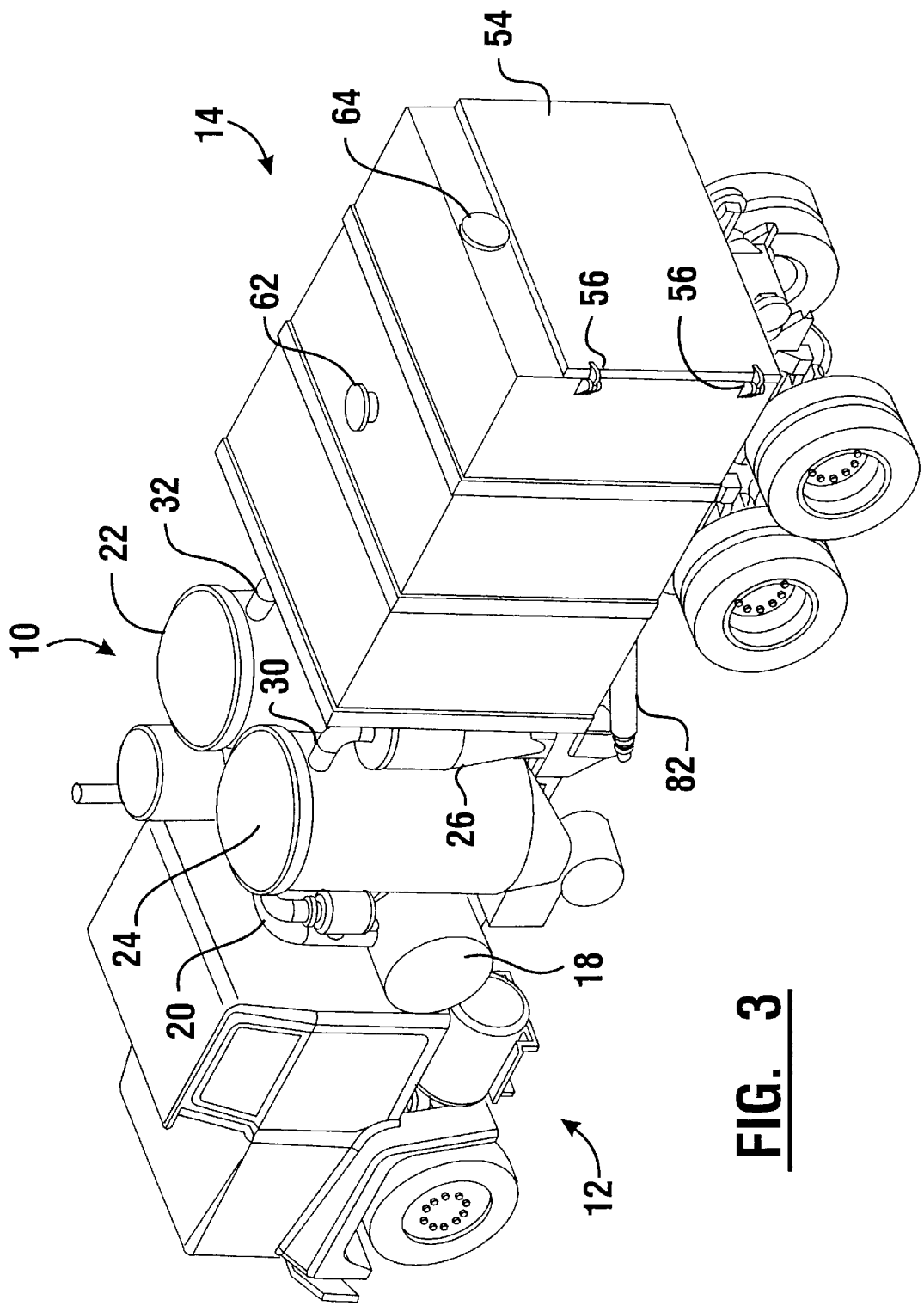
FIG. 3 is a rear right perspective view of the vacuum truck system shown in FIG. 1.

In operation of the vacuum truck system of the preferred embodiment, the vacuum source 16 draws air through the filter units and the separators. Air is drawn from hopper 14 as a result of the connection of inlet pipe 34 with suction pipe 66 and the connection of inlet pipe 38 with suction pipe 66. This is accomplished through the generally fluid tight connection provided by the resilient boot connectors 36 and 40 to the respective inlet pipes of the cyclone separators when the hopper 14 is in the position shown in FIGS. 1 through 3. Material is drawn into the hopper through either first conduit 62 or second conduit 64. The collected material, which may be solid material, liquid material or a combination of both, passes into the plenum chamber 60 and tends to fall to the bottom of the hopper due to the quiescent air conditions therein.

Material which is pulled into the openings 70, 72 of suction pipes 66 and 68 respectively, may be passed through the cyclone separators 26 and 28. Much of the particulate material which remains in the air flow is separated by the centrifugal action of the cyclone separators, and collects at the bottom thereof. Alternatively, flow through the cyclone separators may be bypassed through appropriate valving as later explained.

Particulate material which may be too light to be captured by the cyclone separators is passed from the outlets thereof into the connected filter units 24 and 26. The air passes through the filter bags in the filter units moving from the areas outside to the areas inside of the filter bags. As the air moves across the bag material, particulates and other impurities tend to collect on the outside of the bag until discharged therefrom in a manner later explained.

Air leaving the filter units 22 and 24 passes through manifold 20 into the final filter which is fluidly positioned before the vacuum pump in housing 18. This final filter prevents contaminants from reaching the vacuum pump in the event that one of the filter bags should become dislodged or torn.

Figure 4:
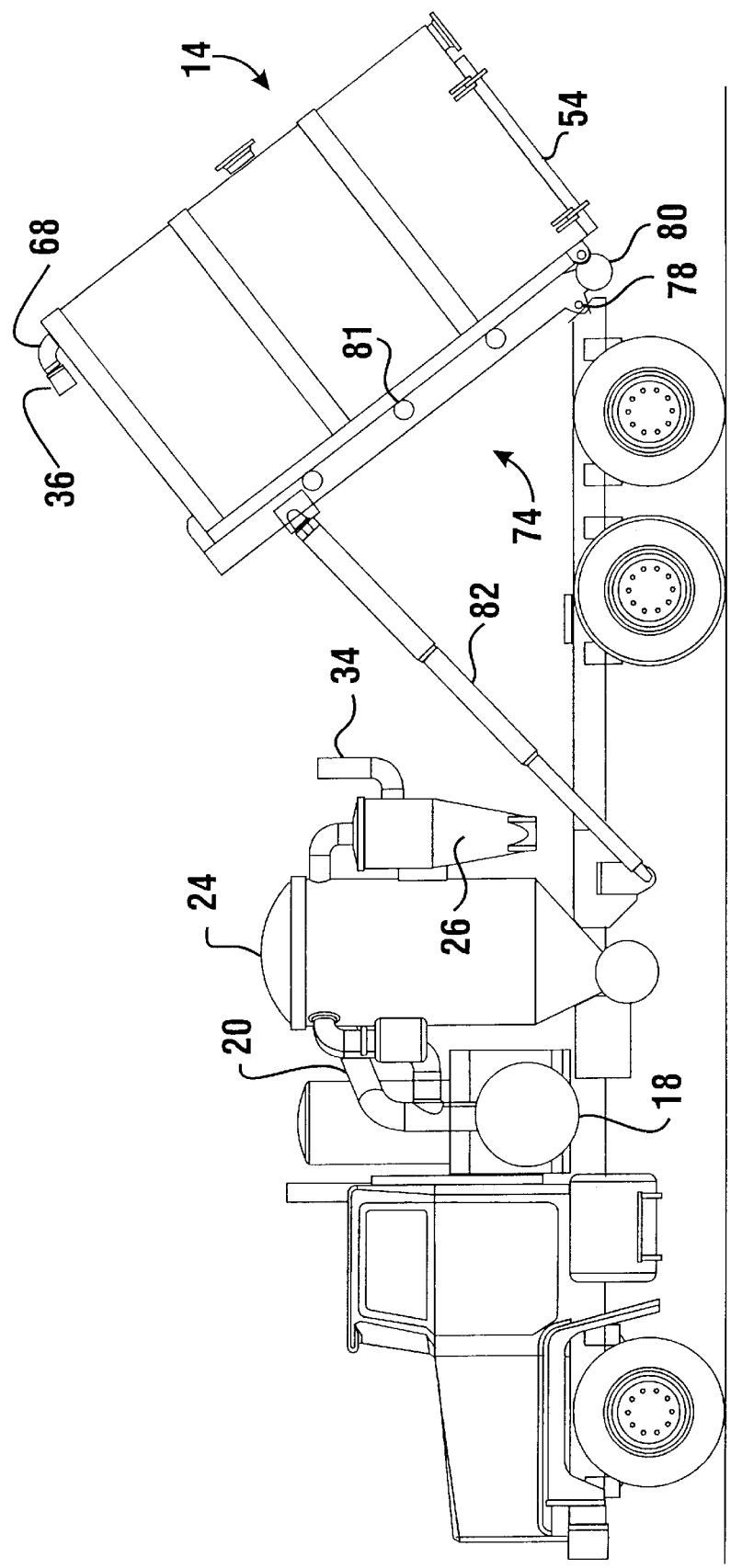
FIG. 4 is a view of the vacuum truck system with the tilt bed in a raised position for purposes of dumping the contents of the hopper.
Figure 5:
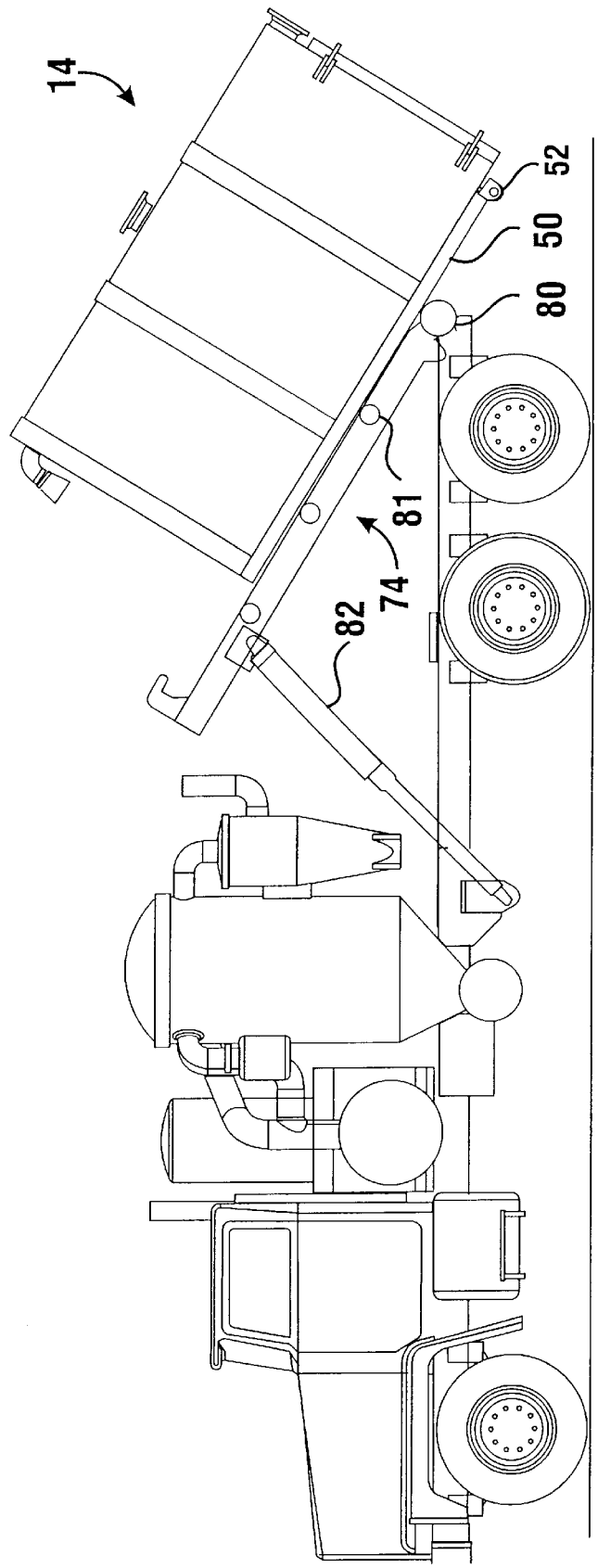
FIG. 5 is a view of the vacuum truck system with the tilt bed in a raised position suitable for moving the hopper moving off the tilt bed.
Figure 6:
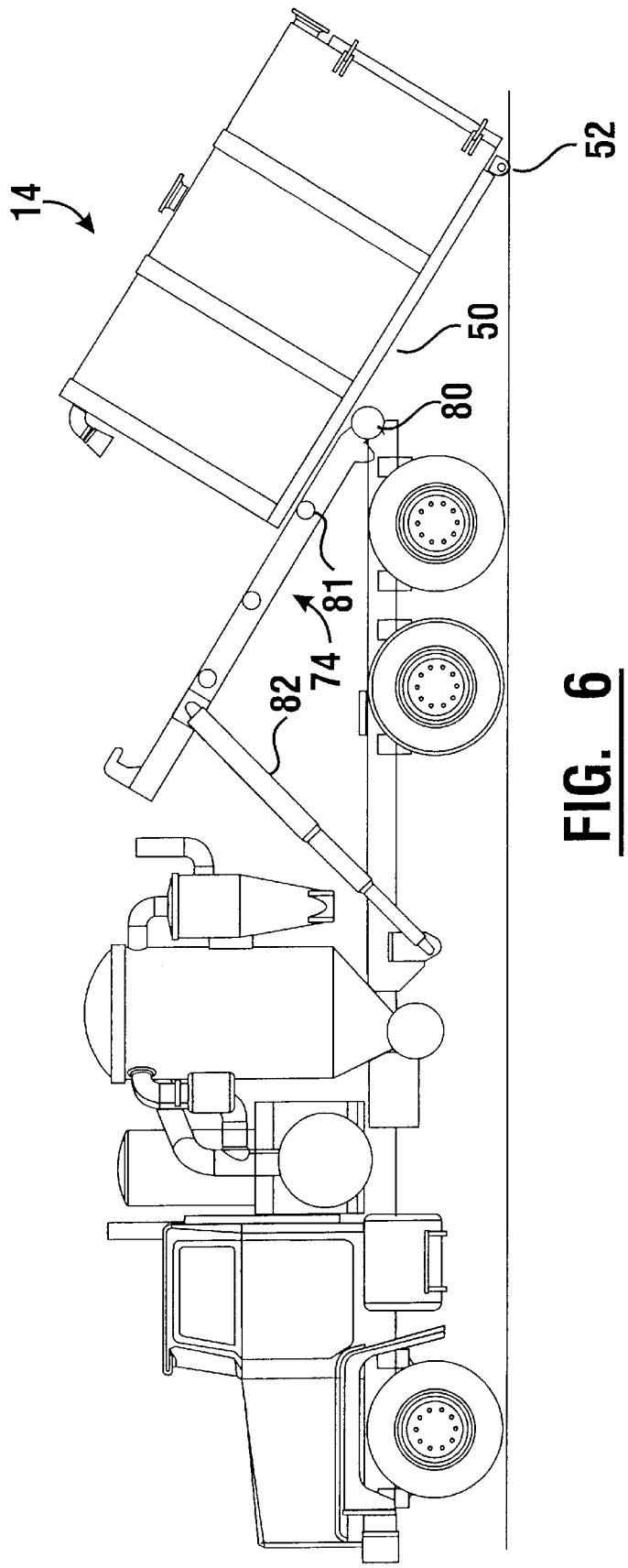
FIG. 6 is a view similar to FIG. 5 with the hopper moved further off the tilt bed.
Figure 7:
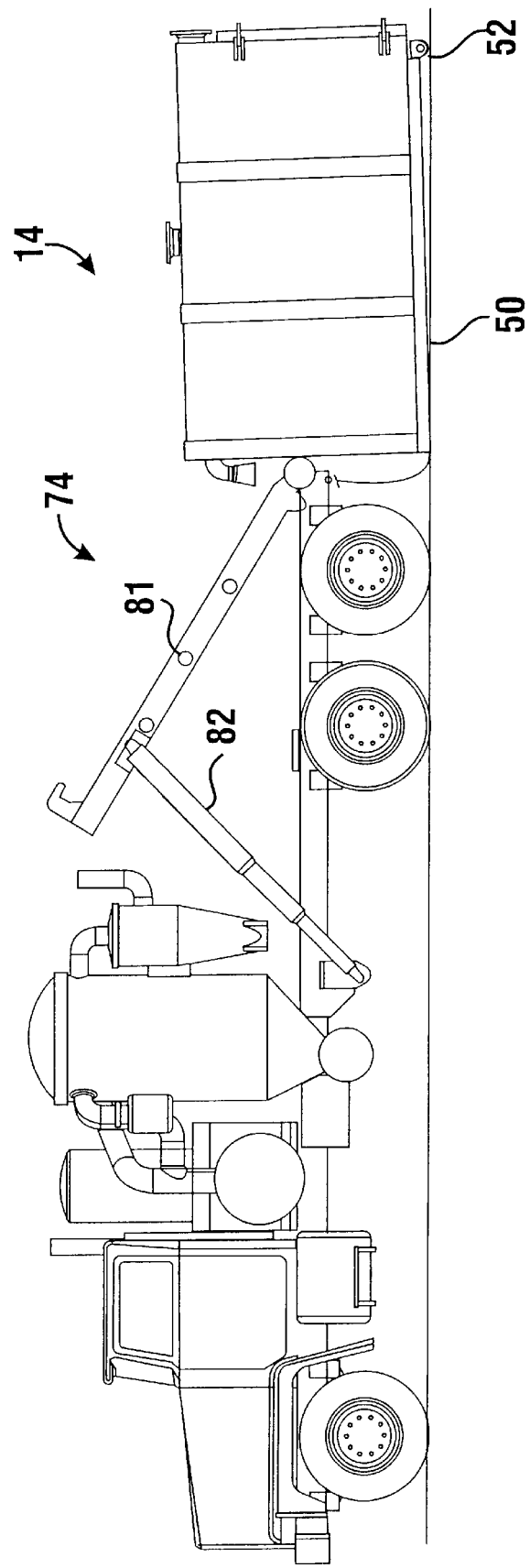
FIG. 7 is a view similar to FIG. 5 in which the hopper has been removed from the tilt bed.
Figure 8:
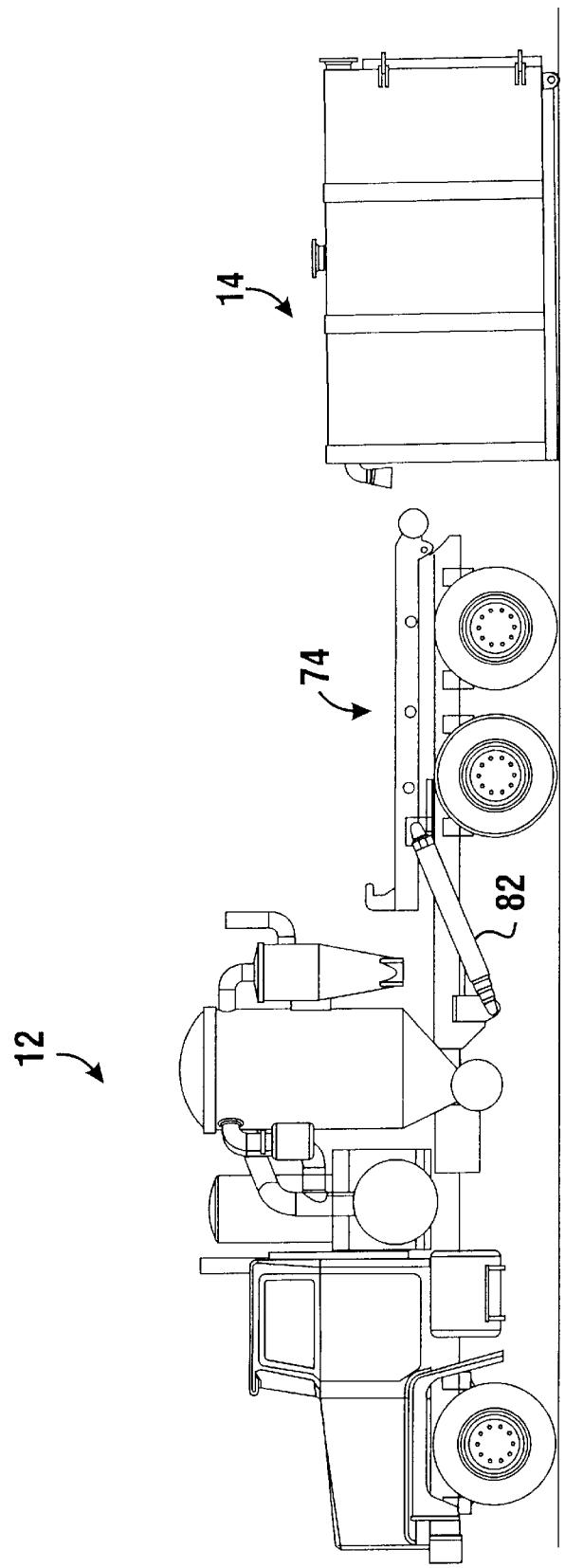
FIG. 8 is a view similar to FIG. 5 in which the hopper is separated from the truck portion.

After material has been collected in the hopper 14 the material may be removed from the hopper by dumping the material therefrom. This is accomplished by extending arms 82 to their maximum length in the manner shown in FIG. 4 and opening door 54 on the rear wall of the hopper. As the arms are extended hopper 14, which is supported on the tilt bed 74, has its front end tilted upwardly. The tilting of the hopper portion causes the inlet pipes 34 and 38 to the cyclone separators to be disengaged from the boot connectors 36 and 40 when the hopper 14 is in the raised position shown in FIG. 4. As a result the material collected in the hopper 14 will be dumped therefrom through the opening at the rear of the hopper.

A fundamental aspect of the preferred embodiment of the present invention is that the hopper 14 may alternatively be removed from engagement with the truck portion. This is accomplished as shown in FIGS. 5 through 8 by raising arms 82 to a tilted position in which the arms are in a somewhat lesser extended position than that used for dumping the contents of the hopper. The hopper 14 is then moved downwardly on frame 76 of the tilt bed portion 74. When this is done the rollers 80 and 81 on the tilt bed facilitate the movement of the hopper and its supporting rail members 50 moving thereon. Eventually, as the hopper moves downwardly, the rollers 52 of the hopper engage the ground or other supporting surface. Further movement of the hopper 14 relative to the tilt bed portion 74 eventually causes the hopper 14 to be totally disengaged from the truck portion.

The movement of the hopper 14 relative to the tilt bed portion 74 may be accomplished in a controlled manner in numerous ways. In the preferred embodiment a cable hoist type system which includes a cable or similar flexible linear member which is connected to the hopper 14 is used to lower the hopper off the tilt bed in a controlled manner. The cable is moved by a pair of reaving cylinders which are hydraulically actuated. The cable is attached to the front of the hopper with a safety hook or other releasible connector. The cable is guided on a center roll 83 on the rear of the tilt bed 74 as the hopper 14 is moved onto and off the tilt bed. (See FIG. 11) It should be understood however that in other embodiments other approaches to moving the hopper relative to the tilt bed may be used.

Once the hopper has been separated from the tilt bed a new hopper may be installed. This is accomplished by again raising the tilt bed, connecting the cable or other suitable mechanism to the front of the hopper and pulling the hopper on to the tilt bed. The installation of the new hopper is the reverse of that described with reference to FIGS. 5 through 8 for removing the hopper. Once the hopper is in proper position on the tilt bed 74 the arms 82 are retracted and the hopper rotates so that the front is moved downward. As a result of the downward movement of the front portion of the hopper, the suction pipes 66 and 68 again fluidly engage with the inlet pipes 34 and 38 of the cyclone separators.

An advantage of the preferred embodiment of the present invention is that the hopper may be used as a storage facility for holding collected material. This may be desirable in situations where the material in the hopper will need to undergo further processing or disposal at a later time. In this manner the material on the hopper may be left until it is convenient to remove the material therefrom.

A further advantage of the preferred embodiment is that hoppers 14 may be used selectively and only with materials that are compatible with materials that have previously been collected therein. This avoids the need for cleaning hoppers as may be required with conventional vacuum trucks. In addition, the use of dedicated hoppers for certain materials enables the hoppers to be constructed of appropriate materials or lined so as to achieve compatibility with the materials to be collected therein.

A further fundamental advantage of the present invention is that the hoppers, once removed from the truck portion, may be loaded on to other vehicles for transport to disposal or recycling facilities. Such other vehicles may include trucks which include tilt beds, but not a vacuum source or a filtration system. Such trucks will be lighter than a vacuum truck because they do not include the vacuum pump or filtration equipment. Such trucks may transport the hoppers more readily and at a lower cost than a vacuum truck. Alternatively, the hoppers may be loaded on to flat beds or rail cars for purposes of long distance transport. This avoids the need to use the vacuum truck which originally collected the material for purposes of transporting the collected material.

Figure 12:
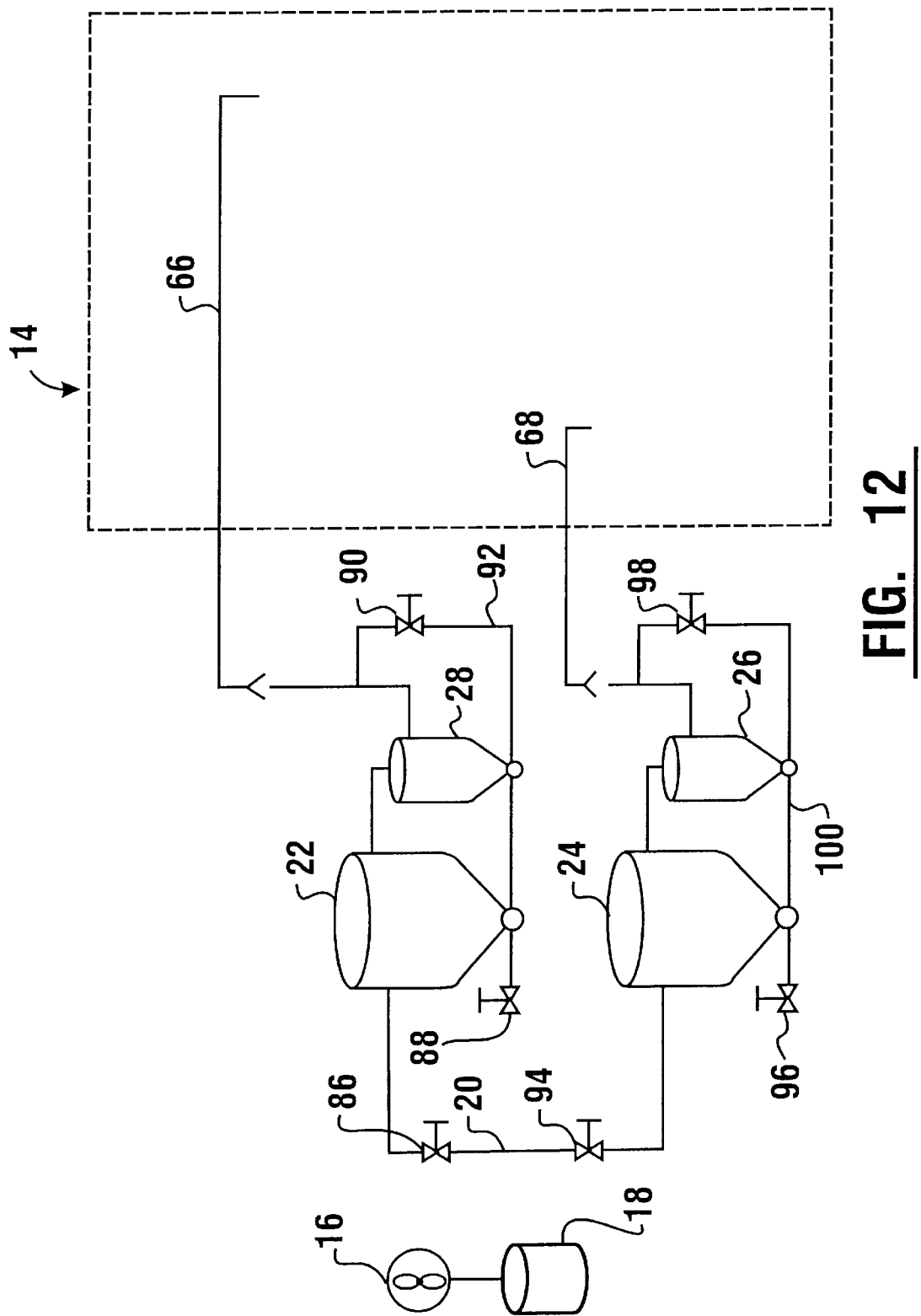
FIG. 12 is a schematic view of a first embodiment of the vacuum piping which provides the self-cleaning features for the filters of the vacuum truck system.

A further fundamental advantage of a preferred embodiment of the present invention is that it enables collection of material captured by the cyclone separators or filter units in the hopper before the hopper is dumped or replaced. In the preferred embodiment of the invention the filter units 22 and 24 are periodically cleaned by periodically directing a blast of pressurized air against the area on the inside of the filter bags within the units. This causes a substantial portion of the material collected on the outside of the filter bags to fall downwardly into the bottom of the filter units. After this has been done the material may be drawn out of the filter units in the manner explained with reference to FIGS. 12 through 16. For example, as shown in a first embodiment in FIG. 12, if filter unit 22 and cyclone separator 28 are to be cleaned, a valve 86 on manifold 20 is closed so that vacuum is no longer drawn on filter unit 22 or cyclone separator 28. A valve 88 is then moved from a closed to an open position while a valve 90 is moved from a closed to an open position.

The opening of valve 88 enables air to be drawn into line 92 which is connected to the lowermost portions of the filter unit 22 and cyclone separator 28. This causes the collected material therein to be passed through valve 90 and into suction pipe 66. This results in the material being removed from the filter unit 22 and cyclone separator 28 and deposited in hopper 14.

It will be understood that when valve 86 is closed and valves 88 and 90 are opened, the vacuum continues to be drawn in hopper 14 through filter 24 and suction pipe 68. This vacuum causes the reverse flow through suction pipe 66 and enables the material to be deposited in the container.

After the material collected in filter 22 and cyclone 28 is removed, the valves 90 and 88 are returned to the closed position and valve 86 is opened. This enables the system to run in the usual manner as previously described. Similarly, when filter 24 and cyclone separator 26 are to be cleaned a valve 94 in manifold 20 is closed as a valve 98 is opened to a line 100 which is connected to the bottom portions of filter 24 and cyclone separator 26. A valve 96 is opened to atmosphere. This causes material to be drawn from filter 24 and separator 26 and into the hopper. Thereafter closing valves 96 and 98 and reopening valve 94 restores the system to its usual operation.

The preferred embodiment of the present invention is particularly valuable where hazardous or other materials are being collected and it is desired to deposit as much of the material as possible within the hopper 14 during the collection operation. It will be appreciated that the operation of the valves which control the cleaning of the filters and cyclone separators may be achieved using solenoid or other actuated valves which are controlled by appropriate circuitry. This circuitry may be manually operated from a control panel so as to achieve cleaning of the filters when desired by an operator. Alternatively, vacuum sensors may be placed on the upstream and downstream sides of the filter units, and when the vacuum sensors sense conditions indicative of significant blockage, a desirable air blast to clean the internal filter bags and the reverse flow may be initiated automatically. Such operation assures the maximum vacuum is achieved and the system runs at high efficiency.

Figure 13:
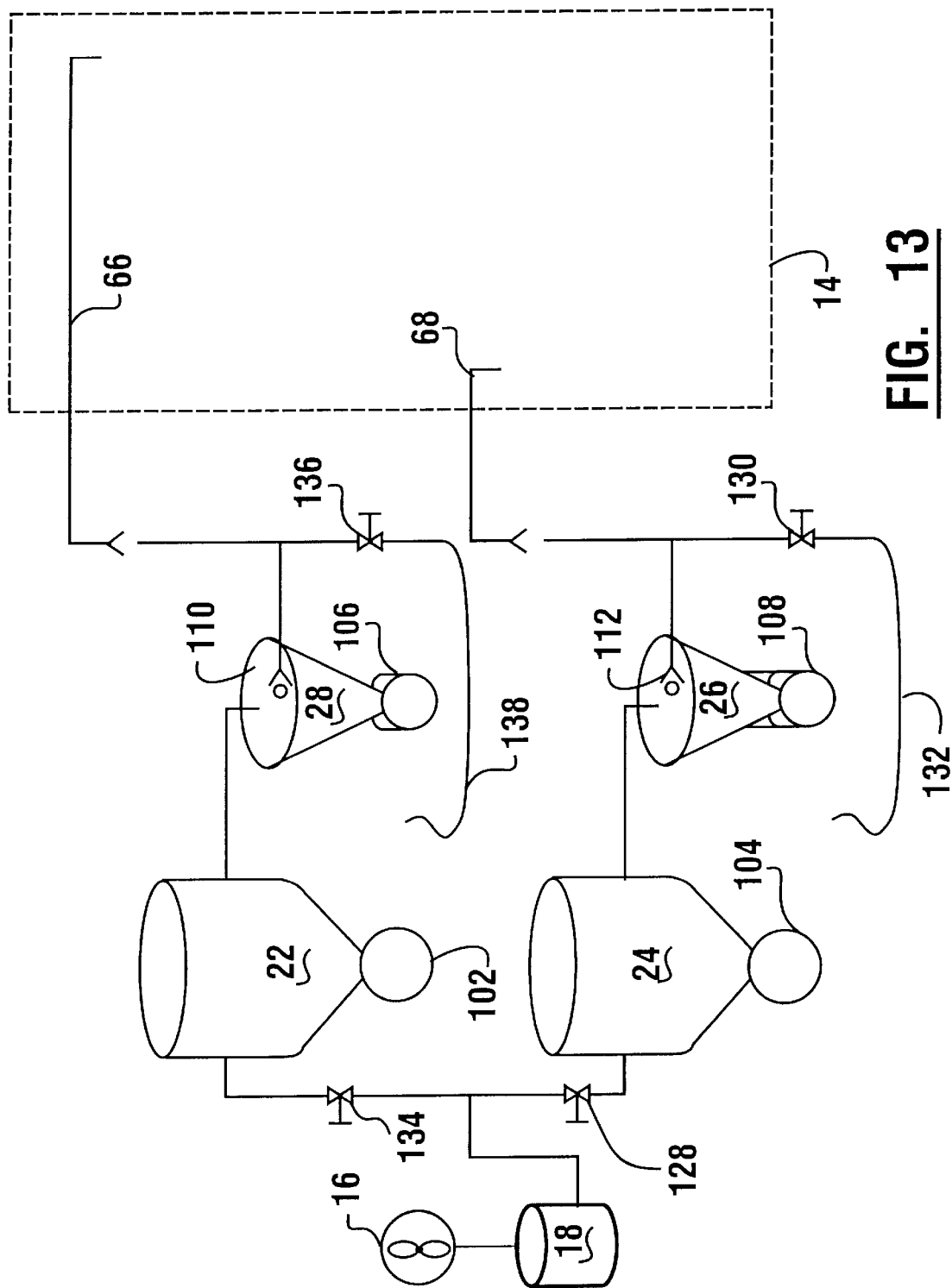
FIG. 13 is a schematic view of a second embodiment of the vacuum piping which provides the self cleaning features for the filters of the system.

An alternative arrangement for the vacuum piping of the vacuum truck system is shown in FIG. 13. During normal operation vacuum is drawn through filter unit 22 and cyclone separator 28, as well as filter unit 24 and cyclone separator 26. Material collected in filter unit 22 collects in a chamber 102 at the bottom thereof. Chamber 102 is closed when the filter unit is in operation, but includes a hatch (not shown) which may be opened for cleaning. Filter unit 24 has a chamber 104, similar to chamber 102 at the bottom thereof. Material collected in the filter units falls into the respective chambers.

Cyclone separator 28 has a chamber 106 positioned at the bottom thereof. Chamber 106 is closed during operation of the cyclone separator, but has a hatch (not shown) which can be opened. Material collected in separator 28 falls into chamber 106. Cyclone separator 26 has a chamber 108 positioned at the bottom thereof. Chamber 108 is similar to chamber 106.

Cyclone separator 28 includes a check valve 110 in the interior thereof. Check valve 110 is configured to allow air flow into the separator, but to block flow out of the separator. Cyclone separator 26 has a check valve 112 in the interior thereof. Check valve 112 is similar to check valve 110, that only enables air flow into separator 28.

As in the preferred form of the invention check valves 110 and 112 are identical, only one will be described. Check valve 112 is shown in greater detail in FIG. 14. Inlet pipe 34 extends into the interior of separator 26 and terminates at an open end 114. A moveable valve member 116 is positioned adjacent to open end 114. As shown in FIG. 15 valve member 116 includes a plate portion 118, and a shaft portion 120 which is attached to the plate portion.

The free ends of shaft 120 extend in transversely spaced guides 122 in the interior of separator 26. Guides 122 each include a vertically extending slot 124. The shaft portion 120 is rotatable in the slots 124 in guides 122. Cyclone separator 26 includes a removable top 126. When the top 126 is in position on the separator 26 it closes slots 124 so shaft 120 is constrained to rotate in the guides. However when top 126 is removed, such as during servicing of the separator, valve element 116 can be readily removed from the guides. This facilitates repair or replacement.

During operation the vacuum drawn on separator 26 pulls air from the hopper, through inlet pipe 34 and into the interior of the separator through open end 114. The air flow moves the valve element to the position shown in phantom in FIG. 14. Air is readily enabled to flow into separator 26. However if vacuum is drawn on inlet pipe 34, plate portion 118 of valve member 116 moves abuttingly against open end 114. Air flow out of the interior area of the separator is thereby generally prevented.

As shown in FIG. 13, when it is desired to clean out filter unit 24 and cyclone separator 26, a valve 128 is closed. Closing valve 128 causes a vacuum to be drawn on separator 26 through filter unit 22, separator 28, suction pipe 66, hopper 14 and suction pipe 68. The suction drawn on separator 26 closes check valve 112.

Chambers 104 and 108 are opened by removing the hatches thereon. A valve 130 is then opened. Opening value 130 causes a suction to be drawn through a hose 132. Hose 132 is used to draw the material out of chambers 104 and 108. This material is collected in hopper 14. After chambers 104 and 018 are cleaned, valve 130 is closed and the hatches reinstalled on the chambers. Valve 128 is then opened and filter unit 24 and separator 26 again operate in the usual manner.

Filter unit 22 and separator 28 may be cleaned in a similar manner. To clean these units a valve 134 is closed. Closing valve 134 causes a suction to be drawn on suction pipe 66 which closes check valve 110. The hatches on chambers 102 and 106 are then removed. A valve 136 is then opened which draws suction on a hose 138 which is used to clean the material out of chambers 102 and 106. After cleaning, returning the filter unit 22 and separator 28 to normal operation requires closing valve 136, reinstalling the hatches on chambers 102 and 106 and opening valve 134.

It should be understood that while each filter unit and separator has a separate clean out chamber, in alternative embodiments the chambers may be combined. For example, unit 24 and separator 26 may share a common clean out chamber. Similarly, unit 22 and separator 28 may share a common clean out chamber. This reduces the number of hatches that must be opened and may shorten clean out time.

Figure 16:
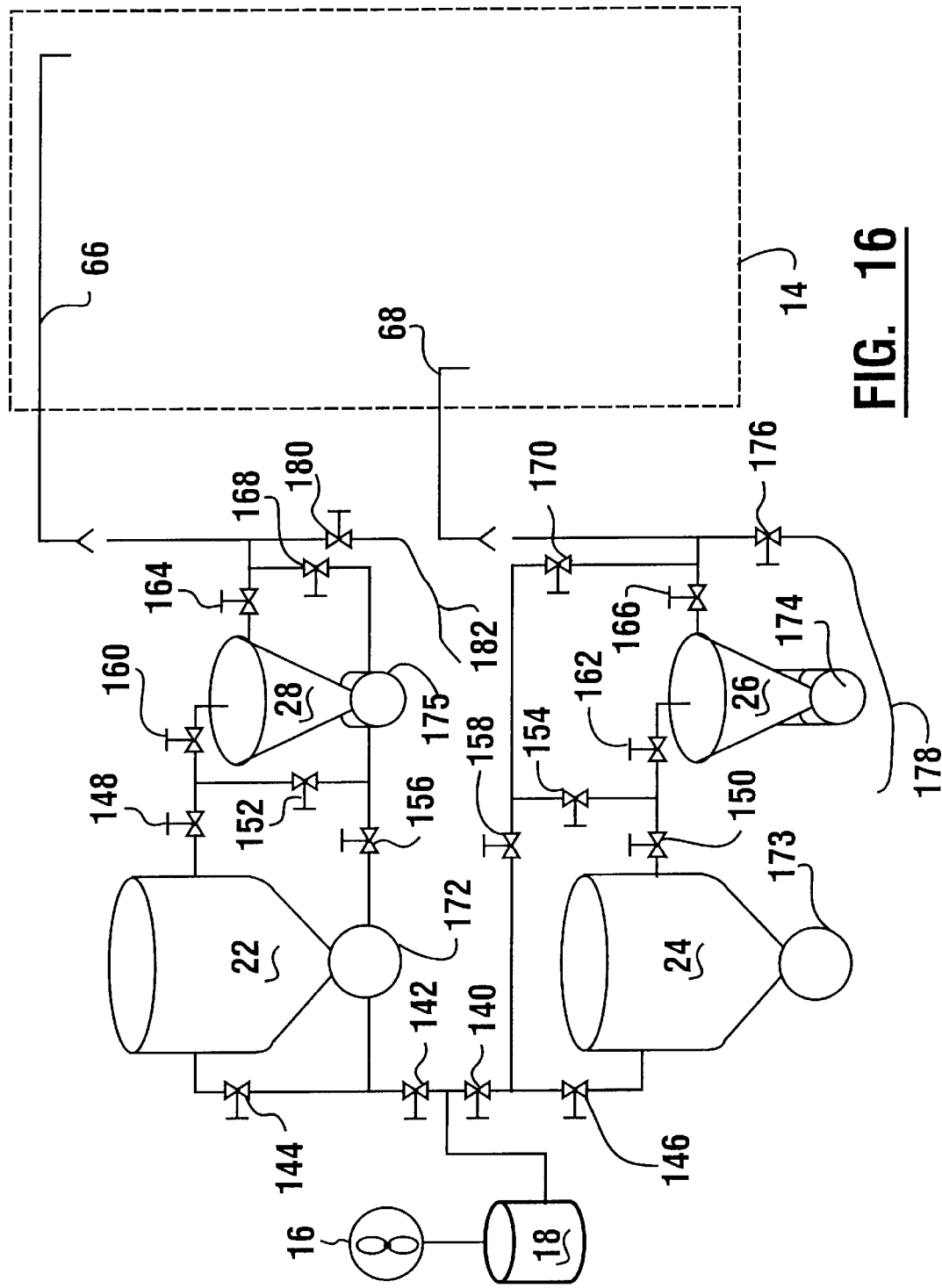
FIG. 16 is a schematic view of a third embodiment of the vacuum piping for the vacuum truck system.

A further alternative embodiment of the vacuum piping of the vacuum truck system is shown in FIG. 16. The configuration shown in FIG. 16 is used for systems where it may be desirable to filter at certain times using only cyclone separators 26, 28, and to bypass filter units 24 and 26. Conversely the configuration shown in FIG. 16 enables using only the filter units 22, 24 and bypassing the separators 26, 28.

Bypassing the filter units 22, 24 may be desirable when the material being collected is wet or otherwise of a consistency that will block air flow through the internal bag filters in units 22 and 24. To bypass units 22, 24, valves 140, 142, 156, 158, 152, 154, 160, 162 and 166 are opened, while valves 144, 146, 148, 150, 168 and 170 are closed. This enables air flow from the hopper to pass through the cyclone separators and directly to the final filter in housing 18.

Bypassing the cyclone separators may be desirable where the material collected is such that the action of the separators is undesirable. This may occur for example when the material being collected is readily pulverized and the cyclone action will break it into finer particles that are more difficult to collect. The cyclone separators are bypassed by opening valves 140, 142, 144, 146, 148, 150, 152, 154, 168 and 170, while closing valves 156, 158, 160, 162, 164 and 166. In this condition air drawn from the hopper goes only into filter units 22 and 24.

It should be understood that the valves may be electrically actuated and automatically controlled electronically to switch between the filter units only/cyclone separators only modes. Alternatively, mechanical or other interlocks may be provided to prevent all the units from being inadvertently bypassed.

In the embodiment shown in FIG. 16 a chamber 172 extends at the bottoms of filter units 22 and a chamber 173 extends at the bottom of filter unit 24. Chamber 172 and chamber 173 each include a removable hatch (not shown). A chamber 174 extends at the bottom of separators 26 and a chamber 175 extends at the bottom of separator 28. Chamber 174 and chamber 175 each also include a removable hatch (not shown).

To clean chamber 172, the valves are placed in the "filters only" mode. The valves 142 and 168 are changed from the open to the closed positions. In this condition suction continues to be drawn on hopper 14 through filter 24. The hatch to chamber 172 is removed. A valve 180 is then opened which causes vacuum to be drawn through a hose 182 which is used to clean the material from chamber 172. Material from chamber is then drawn into the hopper through hose 182. Any material which passes through the hopper is collected in filter 24. Once chamber 172 has been cleaned the hatch is replaced and valve 180 is closed. Valves 168 and 142 are reopened so both filters 22 and 24 are returned to operation. Chamber 173 may be cleaned in a similar manner in the "filters only" mode. This is done by closing valves 140 and 170 and opening valve 178. This enables cleaning chamber 173 with hose 178 when the hatch on chamber 173 is removed.

Cleaning out chambers 174 and 175 is accomplished in a similar manner when the units are run in the "separators only" mode. To use hose 178 to clean chamber 174, valves 140 and 166 are moved to the closed position, while valve 176 is opened. In this position separator 26 is isolated and vacuum continues to be drawn on hopper 14 through separator 28. The hatch on chamber 174 is opened and the material removed through hose 178. Any material which passes through the hopper is collected in separator 28. Closing chamber 174, closing valve 176, and opening valves 140 and 166 returns the system to operating using both separators. Chamber 175 may be cleaned in the "separators only" mode using hose 180. This is done by closing valves 142 and 164, removing the hatch from chamber 175 and opening valve 180.

It should be understood that the numerous valves provided in the system may advantageously include electronic actuators and be connected to control circuitry which automatically configures the valves in various modes, including the clean out modes. Appropriate interlocking of the valve conditions may be provided to assure that the desired flow is achieved and damage to the system is avoided.

Figure 17:
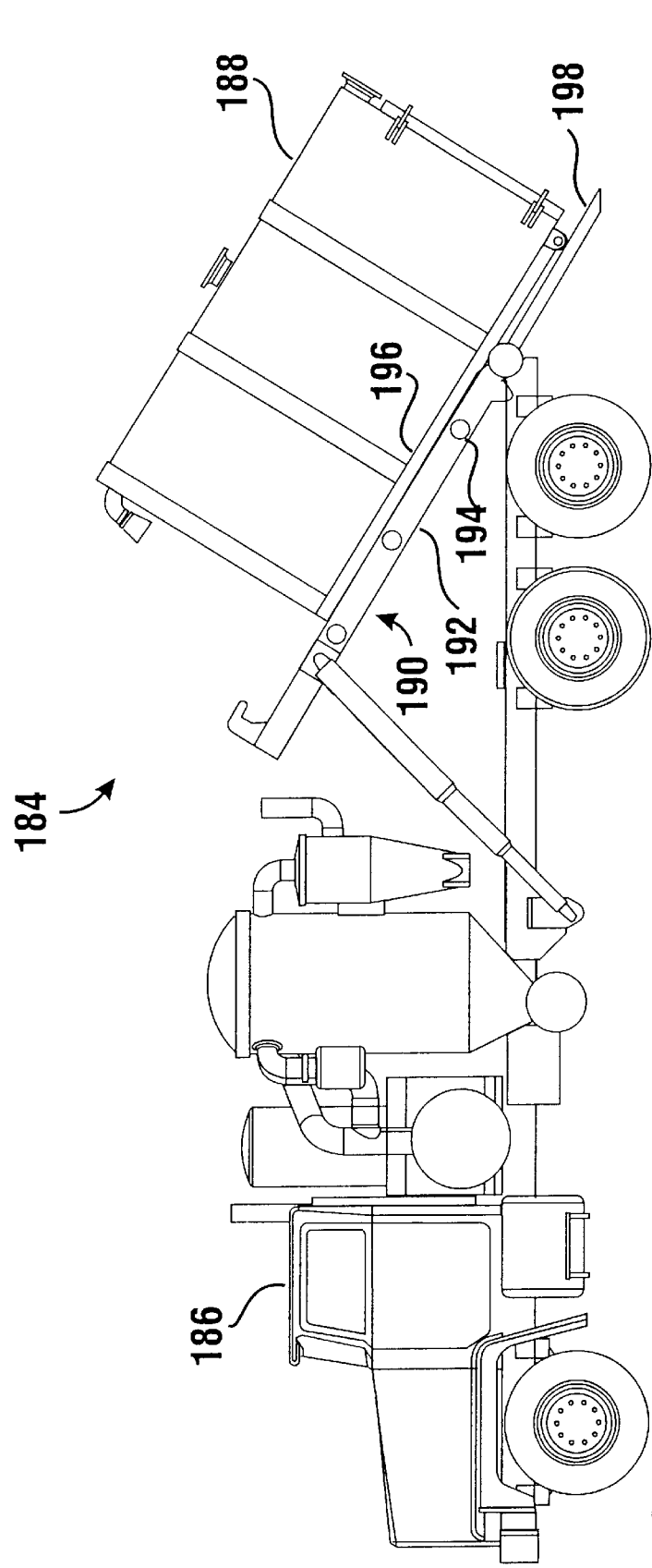
FIG. 17 is an elevational side view of a second embodiment of a vacuum truck system of the present invention.

An alternative embodiment of a vacuum truck system generally indicated 184 is shown in FIG. 17. Vacuum truck system 184 is similar to system 10 except as otherwise noted. Vacuum truck system 184 may have any one of the valving configurations previously described.

Vacuum truck system 184 includes a truck portion 186. Vacuum truck system 184 further includes a removable container 188. Truck portion 186 further includes a tilt bed portion 190. Tilt bed portion 190 is similar to tilt bed portion 74 of the first embodiment in that it can be used to tilt container 188 for purposes of moving the container on and off the truck portion.

Tilt bed portion 190 includes a pair of spaced frame members 192. Rollers 194 are mounted on frame members 192 and facilitate moving container 188 thereon. Rollers 194 engage spaced rails 196 on the lower portion of the container 188.

Figure 18:
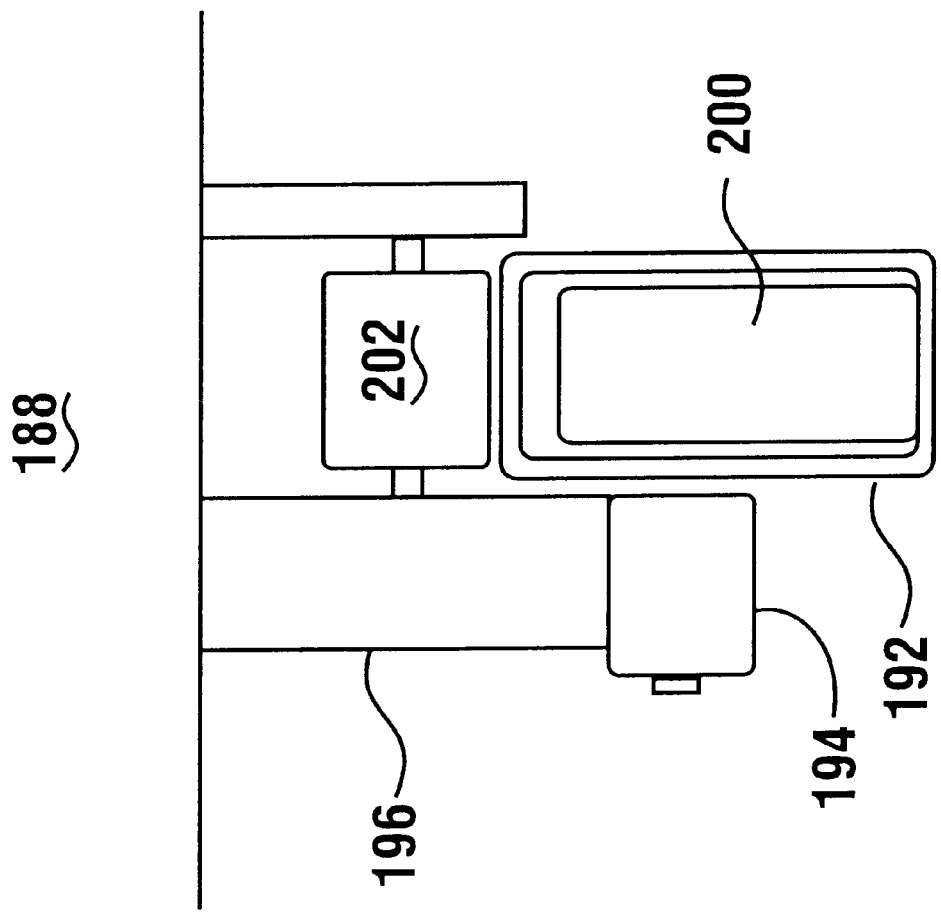
FIG. 18 is a rear view of the underside of a hopper used in the second embodiment and a portion of a tilt bed.

Tilt bed portion 190 further includes a retractable tail portion 198. As shown in FIG. 18, tail portion 198 includes tail members 200. Tail members 200 are movable in telescoping relation in frame members 192 of the tilt bed portion of 190. The two tail members 200 which comprise the tail portion 198 are transversely connected by a member (not shown) and are movable by a hydraulic cylinder or similar moving device.

Container 188 differs from container 14 in that it includes a plurality of hopper rolls 202. Hopper rolls 202 are mounted for rotation on the container 188. The hopper rolls 202 are positioned inboard of the rails 196 on each side of the container.

The use of the hopper rolls facilitates moving container 188 on and off the tilt bed. This construction is particularly useful when the tilt bed portion is in the tilted position shown in FIG. 17, and the hopper 188 is being moved toward a position in which it is separated from the truck portion 186. By extending the tail portion 198 prior to moving the container toward the separated position the container is less likely to move over center and tip. This is because the hopper rolls 202 on the rear portion of the container will engage the tail members 200 of the extended tail portion after rails 196 are no longer supported by the rollers 194. This engagement generally maintains the hopper at the angle of the tilt bed portion and prevents the hopper from tipping over onto its rear face. The construction of the alternative embodiment which includes the tail portion 198 and the hopper rollers 202 also makes it easier to move the container 188 onto the tilt bed portion. The container engages and moves onto the tilt bed portion supported on the tail portion in a smooth ramp like manner. Of course as is the case with the previously described embodiments, after container 188 is fully moved onto the tilt bed portion 190 the tilt bed portion is dropped to a generally horizontal transport position. Once the container is in the transport position the tail portion 198 is retracted. The container 188 is placed in fluid communication with the vacuum source through the two filter mechanisms as the container is moved from the tilted position to the transport position on the tilt bed.

Figure 19:
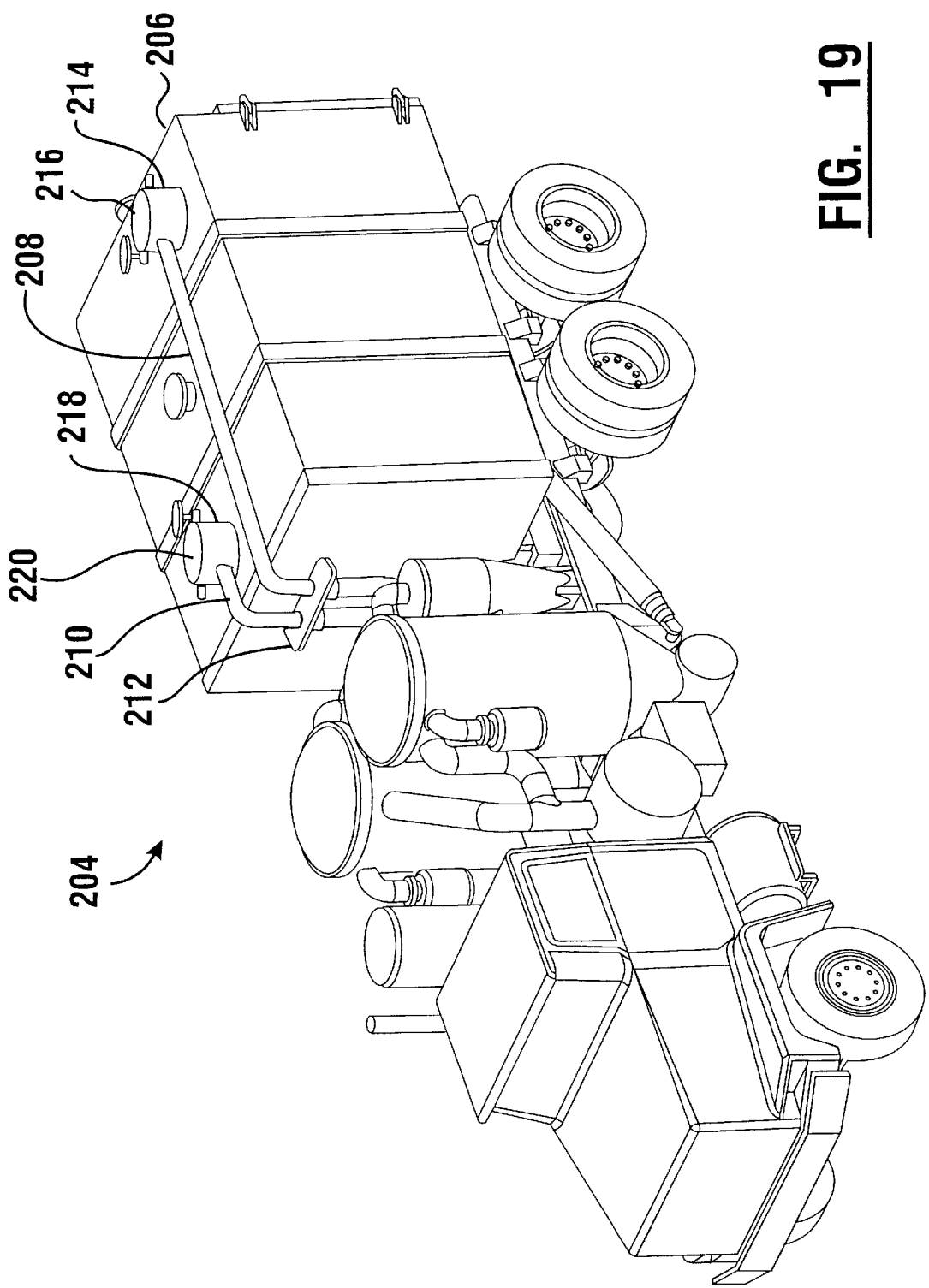
FIG. 19 is an isometric view of a third embodiment of the vacuum truck system of the present invention.

A further alternative embodiment of the vacuum truck system of the present invention is generally indicated 204 in FIG. 19. System 204 is similar to vacuum truck system 10 except as otherwise described. System 204 has an alternative container 206 which differs from the one in the previously described embodiment. In addition vacuum truck system 204 includes an alternative construction for the conduit connectors which releasibly connect the filtration mechanisms and the vacuum source to the container.

As shown in FIG. 19 container 206, unlike the previously described containers, includes vacuum conduits that extend on the outside of the container. Container 206 has a first vacuum conduit 208 and a second vacuum conduit 210 mounted thereon. Conduits 208 and 210 extend from a support plate 212.

First vacuum conduit 208 extends to a raised manhole 214 which is cylindrical and extends generally upward from container 206. Manhole 214 has a cover 216 which is generally closed during operation of the system. Manhole cover 216 may be opened for servicing or inspection purposes. Second vacuum conduit 210 extends to a manhole 218 generally at an opposed end of container 206 from manhole 214. Manhole 218 has a manhole cover 220 mounted thereon. Manhole cover 220 may also be opened for cleaning and inspection purposes.

Figure 20:
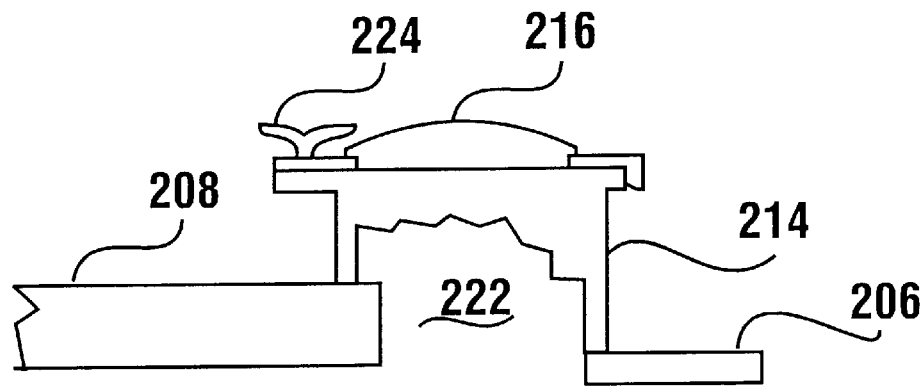
FIG. 20 is a partially sectioned side view of a portion of the hopper used in the embodiment shown in FIG. 19.

As manholes 214 and 218 and their respective manhole covers are similar, only manhole 214 will be described. As shown in FIG. 20 conduit 208 is open to an interior area 222 of manhole 214. Interior area 222 of the manhole is generally open in the downward direction so as to be in fluid connection with the interior of the container. The opening of the conduit into the generally larger cylindrical area inside the manhole results in a low air speed in the upper area of the container 206. This often helps to separate finer particles of material so that they collect inside the container.

Manhole cover 216 is attached in hinged relation to manhole 214. A handle 224 is used to releasibly close the cover 216 in fluid tight relation with the manhole. Appropriate gasketing is provided between the manhole and the cover so that when the cover is closed significant amounts of air do not get pulled into the container. The cover 216 is held closed by handle 224. When the system is not operating and it is desired to inspect the interior of the container 206 or to check the status of the accumulated material therein, handle 224 may be turned so as to enable the cover 216 to open in a hatch like fashion. This enables access to the interior area of the container 206. Opening cover 216 also enables checking to assure that obstructions have not blocked the entrance to conduit 208. Likewise opening cover 216 enables clearing any obstructions in conduit 208 with a snake or similar device. The construction of this embodiment enables quickly accessing and then closing the manhole.

Figure 21:
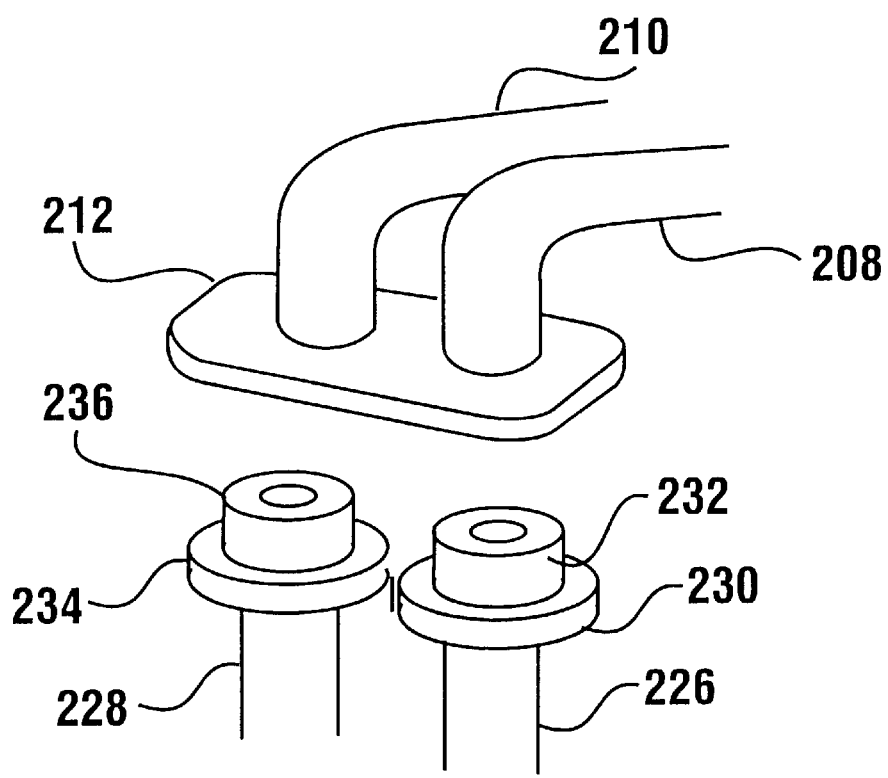
FIG. 21 is an isometric view of the piping connections between the filter mechanisms and the hopper of the embodiment shown in FIG. 19.

As shown in FIG. 21 the releasible connection for container 206 and the filter mechanisms mounted on the truck portion includes the support plate 212 to which conduits 208 and 210 are attached. Support plate 212 includes openings therethrough which correspond to the interior of the conduits. Support plate 212 is preferably attached to the container 206 in a way that prevents the unwanted movement thereof.

Conduits 226 and 228 are releasibly connectable to container 206 through conduits 208 and 210 respectively. Conduit 226 has a radially outward extending flange 230 supported thereon. A resilient cylindrical gasket 232 is supported on flange 230. Gasket 232 includes a central opening therein. Conduit 226 extends part way through the central opening of the gasket 232 when the gasket is in the undeformed position. A flange 234 and gasket 236, similar to flange 230 and gasket 232 respectively, are supported on conduit 228.

When the container 206 is in the transport position the lower surface of support plate 212 engages gaskets 232 and 236. Such engagement deforms the gaskets to as to provide generally fluid tight seals between conduits 226 and 208 as well as conduit 228 and 212. The alignment of the container 206 on the tilt bed as well as the oversized nature of the gaskets 232 and 236 enable the conduits to be placed in fluid connection in a reliable and generally airtight manner. When it is desired to separate the container 206 from the truck portion, the fluid connection between the conduits is readily accomplished by raising the tilt bed portion.

In some operations it may be desirable to provide a liner within the container. Lining the container may facilitate the cleaning thereof. Installing a liner may also be desirable when there is concern about possible adverse chemical reactions with prior materials held within the container or chemical reactions between the material being collected and the structural materials which comprise the container.

Figure 22:
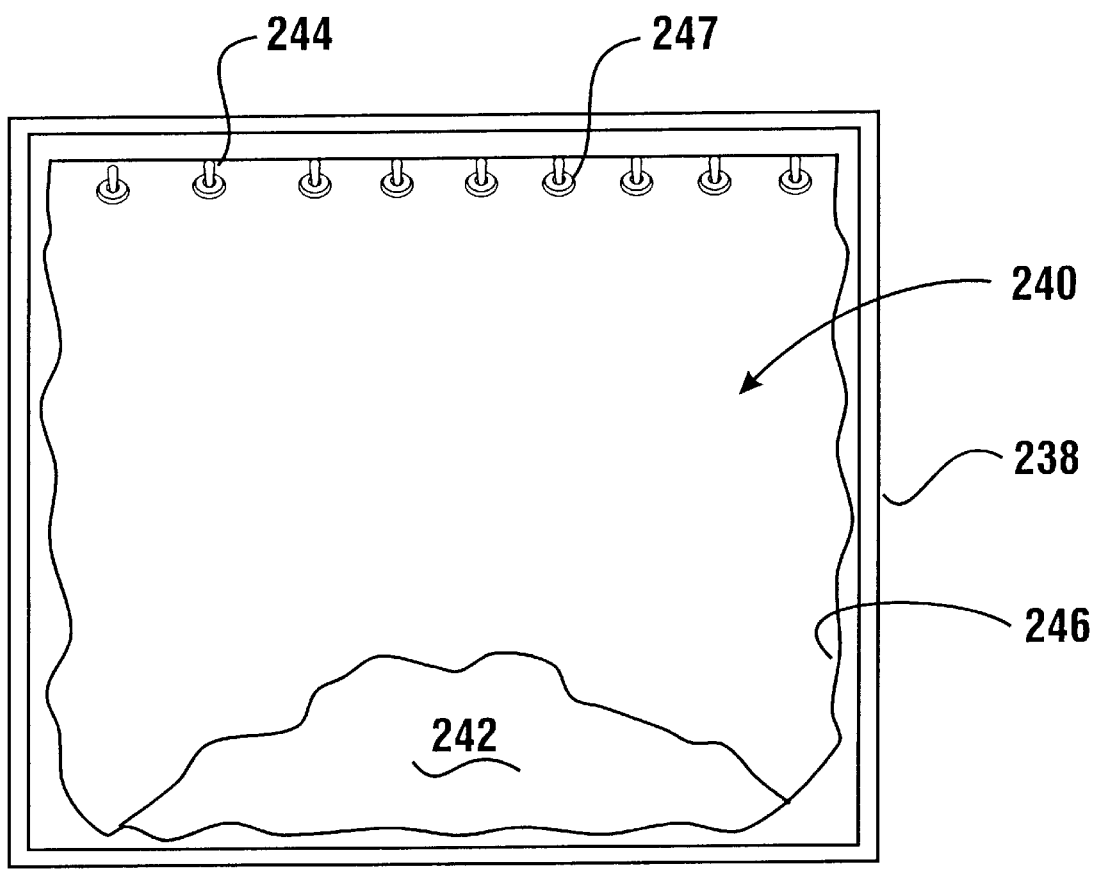
FIG. 22 is a cross sectional interior view of a hopper with a removable liner installed therein.

FIG. 22 shows a cross sectional view of a container. Container 238 may be any one of the containers previously described. Container 238 has an interior area 240 in which material generally indicated 242, is collected. Container 238 has a plurality of hooks 244 which extend from interior surfaces thereof. A liner 246 is supported in the interior area of the container on the hooks 244. Eyelets 247 are preferably provided on the liner 246 so as to minimize the risk of the hooks 244 tearing the liner in the area where the liner is supported.

The liner serves to collect the material 242 thereon. In some embodiments the hooks 244 may extend on three sides of the interior of the container. In such configurations the hooks would not extend on the rear wall. This configuration enables the accumulated material to be removed from the container by dumping it through a door as previously described. In alternative embodiments the hooks 244 may extend about the entire periphery of the interior of the container so that the liner may be supported on all sides thereof. While this would prevent dumping the material out of the container through a door, it minimizes the contact between the accumulated material and the container.

Various types of liners may be provided within the container. The type of liner used would generally depend on the type and properties of the material being collected and the precautions that must be taken in its handling. The embodiment of the container and liner shown facilitates the rapid installation and removal of liners inside the container. Of course in other embodiments other types of liner systems may be used for facilitating the collection of material and cleaning of the interior of the container.

Thus, the new vacuum truck system of the invention achieves the above stated objectives, eliminates difficulties encountered in the use of prior devices and systems, solves problems and attains the desirable results described herein.

In the foregoing description certain terms have been used for brevity, clarity and understanding, however no unnecessary limitations are to be implied therefrom because such terms are used for descriptive purposes and are intended to be broadly construed. Moreover, the descriptions and illustrations herein are by way of examples and the invention is not limited to the details shown and described.

Further, in the following claims any feature that is described as a means for performing a function shall be construed as encompassing any feature capable of performing the recited function and shall not be limited to the features described herein as performing such functions or mere equivalents thereof.

Having described the features, discoveries and principles of the invention, the manner in which it is constructed and operated and the advantages and useful results attained; the new and useful structures, devices, elements, arrangements, parts, combinations, systems, equipment, operations and relationships are set forth in the appended claims.

I claim:

1. Apparatus comprising:

a self-propelled vehicle;

a vacuum source mounted on the vehicle;

a container, wherein the container bounds an interior area, and wherein the container is movable between a first position wherein the container is mounted on the vehicle and a second position wherein the container is separated from the vehicle, and wherein in the first position of the container the interior area is in fluid connection with the vacuum source wherein a vacuum is enabled to be drawn in the interior area, and wherein the container includes a conduit connector in fluid connection with the interior area, whereby material is enabled to be drawn by vacuum into the interior area through a conduit connected to the conduit connector;

a container moving mechanism mounted on the vehicle, wherein the container moving mechanism enables selectively moving the container between the first and second positions.

2. The apparatus according to claim 1 wherein the container includes a rail, and the vehicle further includes a container supporting frame, and further including a plurality of rollers in supporting connection with the container supporting frame, and wherein when the container moving mechanism moves the container between the first and second positions the rail moves relative to the vehicle in supported connection with the rollers.

3. The apparatus according to claim 1 wherein the container moving mechanism includes a tilt bed, and wherein the tilt bed is moved to a tilted position when the container is moved between the first and second positions, and wherein the container is moved between the first and second positions in supported connection with the tilt bed.

4. The apparatus according to claim 3 wherein the container includes a rail, and further comprising a plurality of rollers on the tilt bed, and wherein when the container is moved between the first and second positions the rail is moved relative to the vehicle in supported connection with the rollers.

5. The apparatus according to claim 4 wherein the container further includes a plurality of further rollers in supporting connection with the rail, and wherein the tilt bed further comprises an extendable tail portion, and wherein said further rollers engage the tail portion as the container moves between the first and second positions.

6. The apparatus according to claim 4 wherein the container includes a pair of spaced rails, and wherein the rollers include two linearly arranged sets of rollers, wherein in the first position each rail is supported on one set of rollers.

7. The apparatus according to claim 4 and further comprising a lifting mechanism in operative connection with the tilt bed, wherein the lifting mechanism is selectively operative to move the tilt bed between the tilted position and a transport position wherein the rail extends generally horizontal.

8. The apparatus according to claim 7 wherein the moving mechanism moving the container includes a flexible, generally linear member, wherein the linear member is in operative connection with the container and moves the container relative to the vehicle, as the container moves from the second position to the first position.

9. The apparatus according to claim 3 and further comprising a lifting mechanism on the vehicle, wherein the lifting mechanism is in operative connection with the tilt bed, and wherein the lifting mechanism is operative to selectively move the tilt bed between a transport position, wherein the tilt bed extends generally horizontally, the tilted position and a discharge position, and wherein the container further includes a discharge door, wherein when the discharge door is opened and the container is in the first position on a tilt bed, and the tilt bed is moved to the discharge position, material in the interior area is enabled to be discharged through the door.

10. The apparatus according to claim 9 wherein the vehicle has a rear area, and wherein the tilt bed rotationally moves about a pivot in the rear area, and wherein in the tilted position the tilt bed is rotationally disposed in a first rotational direction from the transport position, and wherein in the discharge position the tilt bed is disposed in the first rotational direction from the tilted position.

11. The apparatus according to claim 1 wherein the conduit connector is in operative connection with a conduit and wherein the conduit terminates in a plenum which is open to the interior area, and wherein the conduit is in fluid connection with the plenum through an aperture, and wherein a side wall bounds the plenum on a side opposite the aperture, and wherein a shelf surface extends from the side wall, wherein the shelf surface is configured to cause a coating of material entering the plenum to accumulate on the side wall, whereby erosion of the side wall is reduced.

12. The apparatus according to claim 11 wherein the container includes a further conduit in operative connection with the plenum, and wherein the further conduit is in fluid communication with the plenum through a further aperture, and wherein the further aperture extends in a plane generally perpendicular to the side wall.

13. The apparatus according to claim 1 and further comprising a first material removal mechanism and a second material removal mechanism, wherein in the first position of the container each of the first and second mechanisms are in fluid connection with the vacuum source and the container, wherein each of the first mechanism and the second mechanism are positioned fluidly intermediate of the vacuum source and the container, and further including valving wherein the valving is selectively operable to cause material accumulated in one of the first or second mechanisms to be drawn by vacuum into the container as the other of the first or second mechanisms enables air flow therethrough to draw vacuum in the interior area of the container.

14. The apparatus according to claim 13 wherein at least one of the first or second removal mechanisms includes a cyclone separator, and wherein the cyclone separator includes a check valve mechanism, wherein the check valve mechanism substantially prevents air flow out of the cyclone separator to the interior area.

15. The apparatus according to claim 14 wherein the cyclone separator includes a removable lid and an inside area closed by the lid, and wherein the cyclone separator includes a guide in the inside area, and wherein the check valve includes a shaft portion rotatable in the guide, and wherein the shaft portion is prevented from disengaging from the guide by the lid when the lid is installed on the separator, and wherein the shaft is enabled to disengage from the guide when the lid is removed.

16. The apparatus according to claim 13 wherein each of the first and second mechanisms includes a cyclone separator and a filter, and wherein the valving enables selectively bypassing the air flow through either the cyclone separator or the filter in each mechanism, whereby the cyclone separators or the filters are selectively placed fluidly intermediate of the vacuum source and the container.

17. The apparatus according to claim 13 wherein at least one of the first or second material removal mechanisms includes a chamber having a movable hatch, the movable hatch being movable to enable access to the chamber, and wherein the valving is selectively operable to cut off flow through the one mechanism, and further comprising a hose in operative connection with the container, wherein when flow is cut off to the one mechanism and the hatch is moved to an open position, material is enabled to be removed from the chamber and into the interior area of the container through the hose.

18. The apparatus according to claim 1 wherein the container includes a manhole extending in a generally upper portion thereof, and wherein the manhole includes a movable cover and wherein the manhole may be accessed by moving the movable cover, and wherein when the container is in the first position the vacuum source is in fluid communication with the container through the manhole.

19. The apparatus according to claim 18 wherein the container includes a pair of spaced manholes, each manhole in a generally upper portion of the container, the manholes positioned at generally opposite horizontal ends of the container, and wherein in the first position of the container the vacuum source is in fluid connection with the interior area of the container through both of the manholes.

20. A method for collecting and handling material comprising the steps of:

a) drawing a vacuum on an interior area of a container with a vacuum source, wherein the container is movably mounted on a self propelled vehicle and the vacuum source is mounted on the vehicle;

b) placing material into the interior area of the container through a conduit connector, wherein the material accumulates in the container;

c) moving the container off the vehicle with a container moving mechanism mounted on the vehicle.

21. The method according to claim 20 wherein the moving step includes:

raising a tilt bed on the vehicle to a tilted position;

rolling the container off the tilt bed to a second position in which the container is separated from the vehicle.

22. The method according to claim 20, and after step (c), further comprising the steps of:

further moving another container onto the vehicle; and repeating steps a), b) and c) with a different material.

23. The method according to claim 20 and further comprising the steps of:

further moving the container into supported connection with a different self propelled vehicle;

transporting the container on the different vehicle.

* * * * *